US011269870B2

(12) United States Patent
Bhatia et al.

(10) Patent No.: US 11,269,870 B2
(45) Date of Patent: Mar. 8, 2022

(54) PERFORMING AUTOMATIC SEGMENT EXPANSION OF USER EMBEDDINGS USING MULTIPLE USER EMBEDDING REPRESENTATION TYPES

(71) Applicant: Adobe Inc., San Jose, CA (US)

(72) Inventors: Vidit Bhatia, San Jose, CA (US); Vijeth Lomada, San Jose, CA (US); Haichun Chen, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 175 days.

(21) Appl. No.: 16/149,418

(22) Filed: Oct. 2, 2018

(65) Prior Publication Data

US 2020/0104395 A1   Apr. 2, 2020

(51) Int. Cl.
| G06F 16/00 | (2019.01) |
| G06F 16/242 | (2019.01) |
| G06N 3/08 | (2006.01) |
| G06N 7/00 | (2006.01) |
| G06F 16/26 | (2019.01) |
| G06F 16/248 | (2019.01) |
| G06F 16/901 | (2019.01) |

(52) U.S. Cl.
CPC ........ *G06F 16/2428* (2019.01); *G06F 16/248* (2019.01); *G06F 16/26* (2019.01); *G06F 16/9024* (2019.01); *G06N 3/08* (2013.01); *G06N 7/005* (2013.01)

(58) Field of Classification Search
CPC .... G06F 16/2428; G06F 16/248; G06F 16/26; G06F 16/9024; G06N 3/08; G06N 7/005; G06N 3/0445; G06N 3/0472; G06N 3/084; G06N 3/0454
See application file for complete search history.

(56) References Cited

U.S. PATENT DOCUMENTS

| 10,096,319 | B1 | 10/2018 | Jin et al. |
| 10,134,058 | B2 | 11/2018 | Dasdan et al. |
| 2002/0184047 | A1 | 12/2002 | Plotnick et al. |
| 2006/0212900 | A1 | 9/2006 | Ismail et al. |
| 2013/0117329 | A1 | 5/2013 | Bank et al. |
| 2014/0075464 | A1 | 3/2014 | McCrea |
| 2015/0186478 | A1* | 7/2015 | Yan ................... G06F 16/24578 707/722 |

(Continued)

OTHER PUBLICATIONS

Hochreiter, Sepp; Schmidhuber, Jürgen; "Long Short-Term Memory"; published in Neural Computation Journal; vol. 9 Issue 8, Nov. 15, 1997; pp. 1735-1780.

(Continued)

*Primary Examiner* — Neveen Abel Jalil
*Assistant Examiner* — Paul Kim
(74) *Attorney, Agent, or Firm* — Keller Jolley Preece

(57) ABSTRACT

The present disclosure relates to systems, non-transitory computer-readable media, and methods for expanding user segments automatically utilizing user embedding representations generated by a trained neural network. For example, a user embeddings system expands a segment of users by identifying holistically similar users from uniform user embeddings that encode behavior and/or realized traits of the users. Further, the user embeddings system facilitates the expansion of user segments in a particular direction and focus to improve the accuracy of user segments.

20 Claims, 20 Drawing Sheets

(56) References Cited

U.S. PATENT DOCUMENTS

| | | | |
|---|---|---|---|
| 2016/0232456 A1* | 8/2016 | Jain | G06N 20/00 |
| 2016/0274744 A1 | 9/2016 | Neumann et al. | |
| 2018/0075336 A1* | 3/2018 | Huang | G06N 3/0454 |
| 2018/0225368 A1* | 8/2018 | Grond | G06F 16/34 |
| 2019/0362220 A1* | 11/2019 | Yap | G06N 3/0445 |
| 2020/0073953 A1 | 3/2020 | Kulkarni | |

OTHER PUBLICATIONS

Yuan, Shuhan; Zheng, Panpan; Wu, Xintao; Xiang, Yang; "Wikipedia Vandal Early Detection: from User Behavior to User Embedding" Published 2017 in ECML/PKDD; DOI:10.1007/978-3-319-71249-9_50.

Dai, Hanjun; Wang,Yichen; Trivedi, Rakshit; Song, Le; "Deep Coevolutionary Network Embedding User and Item Features for Recommendation"; arXiv:1609.03675v4 [cs.LG] Feb. 28, 2017.

U.S. Appl. No. 16/149,357, filed Aug. 17, 2020, Notice of Allowance.

U.S. Appl. No. 16/149,357, filed Apr. 14, 2020, Office Action.

Maheshwary et al., "Deep Secure: A Fast and Simple Neural Network based approach for User Authentication and Identification via Keystroke Dynamics", Aug. 2017, ResearchGate, pp. 1-8 (pdf pagination). (Year: 2017).

U.S. Appl. No. 16/149,347, filed May 19, 2021, Preinterview 1st Office Action.

Yuan et al., "Insider Threat Detection with Deep Neural Network", Jun. 12, 2018, ICCS 2018, LNCS 10860, pp. 43-54. (Year: 2018).

U.S. Appl. No. 16/149,347, dated Sep. 22, 2021, Office Action.

* cited by examiner

PERFORMING AUTOMATIC SEGMENT EXPANSION OF USER EMBEDDINGS USING MULTIPLE USER EMBEDDING REPRESENTATION TYPES

BACKGROUND

Advancements in computer and communication technologies have resulted in improved digital content dissemination systems for generating and providing digital content to client devices across computing networks. For example, conventional digital content dissemination systems can execute digital content campaigns of various scales that provide customized digital content items to client devices of individual users in real-time. Further, content dissemination systems can provide digital content items to potential customers via a number of different media channels, such as instant messages, emails, digital alerts, advertisement displays, impressions, notifications, search results, websites, or texts.

Indeed, users routinely access millions of websites or applications a day. Furthermore, a single website, application, or Uniform Resource Locator ("URLs") may receive thousands to millions of visits or views a day. With such large quantities of network destinations and visits, web administrators and marketers often seek to gather information concerning users. In some instances, a web administrator may seek to identify a specific segment of users who have specific characteristics or who have demonstrated a certain pattern of behavior.

The amount of analytic data a system may collect, for even a single website or application, may be unwieldy or too difficult to manage or mine. The amount of data can be particularly problematic for websites or applications that receive thousands or millions of daily visitors or users. Conventional analytics engines often lack the ability to identify and organize captured data in a meaningful way. Even the conventional analytics engines that possess this ability, however, consume significant processing power.

Indeed, conventional analytics engines suffer from a number of technical shortcomings. For example, conventional analytics engines have been unable to efficiently analyze user profile and attribute data to represent users in a uniform manner. More particularly, conventional analytics engines struggle to encode user behavioral data into uniform representations. As a result, conventional analytics engines are hindered from efficiently using previous user data to serve current and future users. To demonstrate, conventional analytics engines often employ statically created rules that fail to capture the full array of users to whom to provide specific content because of the difficulty in understanding user behavior, which is in part due to imbalanced and irregular captured user data.

To cope with these issues, conventional analytics engines have relied on static rules to characterize users into segments. These static rule-based segments often omit users that should fall within a designated segment. For example, conventional analytics engines often create a user segment that includes all users who interacted with two previous campaigns. However, this static-based rule omits users that would have interacted with the two previous campaigns given the opportunity, but missed the chance (e.g., a user was on vacation and did not see a previous campaign, the user's inbox was full and she did not receive content from a previous campaign, there was a connection error preventing the user from fully interacting with a previous campaign).

Moreover, when the number of users in a segment is insufficient, conventional analytics engines employ inefficient methods to add users. Often, while added users share a few traits or behaviors with current users in a designated user segment, the added users are otherwise unlike the current users and poorly fit the desired user segment. Thus, conventional analytics engines produce inaccurate and imprecise user segment expansions. Further, by employing an inaccurate user segment, conventional analytics engines waste computing resources, bandwidth, and memory in providing content to unresponsive users that are not interested in the content.

These along with additional problems and issues exist with regard to conventional analytics engines.

BRIEF SUMMARY

Embodiments of the present disclosure provide benefits and/or solve one or more of the foregoing or other problems in the art with systems, non-transitory computer-readable media, and methods for expanding segments of users by automatically utilizing user embedding representations generated by a trained neural network. For instance, the disclosed systems can expand a segment of users by identifying look-alike or holistically-similar users based on the utilizing uniform user embeddings that encode behavior and/or realized traits of the users. In this manner, the disclosed systems facilitate selection of feature representations that enables the disclosed systems to automatically expand a segment of users in a particular direction or to a particular focus.

To briefly demonstrate, in one or more embodiments, the disclosed systems identify user embeddings for a group of users, where the user embeddings are generated from structured data by a neural network trained to encode user profile data into uniform user embeddings. In addition, the disclosed systems determine a segment of users from the group of users. Based on the selected segment of users, the disclosed systems plot user embeddings corresponding to the selected users in a graphical user interface. Upon providing the visualization, the disclosed systems receive a selection of a user embeddings type and a user similarity metric. Based on the selection, the disclosed systems automatically identify additional user embeddings. Further, the disclosed systems update the visualization to display an expanded segment of users that includes the original user embeddings and the additional user embeddings.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
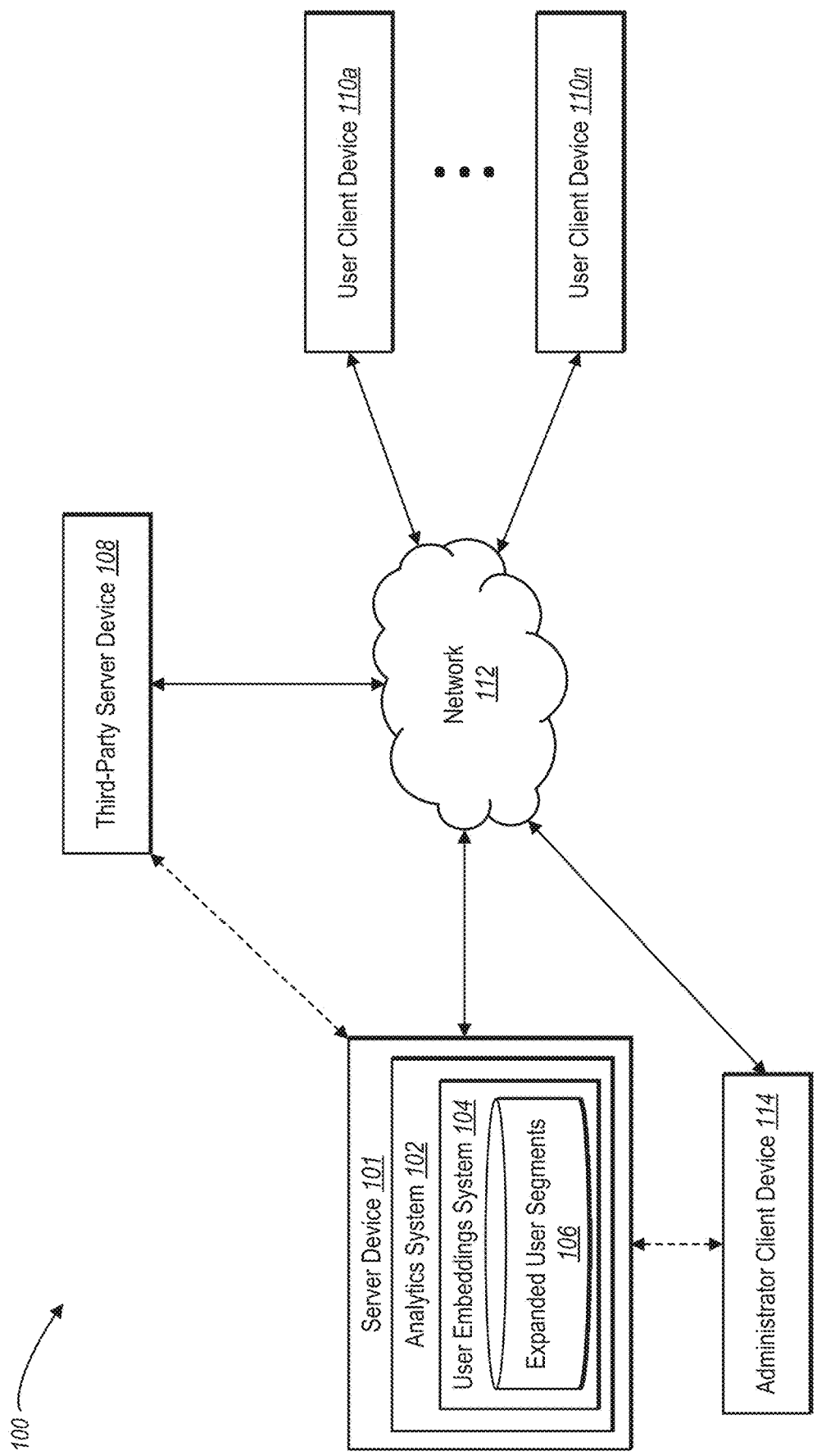
FIG. 1 illustrates a diagram of an environment in which a user embeddings system can operate in accordance with one or more embodiments.

This disclosure describes one or more embodiments of a user embeddings system that expands user segments by utilizing user embedding representations generated by a trained neural network. For instance, in one or more embodiments, using uniform user embeddings that encode user behavior and/or realized user traits, the user embeddings system can determine holistic similarities between users in a group of users. Moreover, the user embeddings system facilitates the expansion of user segments in a particular direction and focus to improve the accuracy of the user segments.

To illustrate, in one or more embodiments, the user embeddings system identifies user embeddings generated for a group of users by a neural network trained to encode user profile data into uniform user embeddings. In addition, the user embeddings system determines a segment of users from the group of users (e.g., a base user segment). Moreover, the user embeddings system receives indications of a user embeddings type and a user similarity metric. In response, the user embeddings system automatically identifies additional user embeddings having the indicated user embedding type and that satisfy the user similarity metric. Further, the user embeddings system updates the visualization on the graphical user interface to display an expanded user segment that includes both the original user embeddings and the additional user embeddings.

As mentioned above, the user embeddings system can provide a visualization of a user segment within a graphical user interface. For example, in various embodiments, the user embeddings system plots a chart of the user embeddings corresponding to users in the base and expanded user segments. In many embodiments, however, because the user embeddings are represented in high-dimensional space, the user embeddings system first reduces the dimensionality of the user embeddings to a two-dimensional or three-dimensional space to display the user embeddings on a computing device.

For users included in a base user segment, the user embeddings system can identify additional users based on determining similar user embeddings or vector representations as user embeddings provide uniform characterizations across all users. In particular, when expanding a user segment, in various embodiments, the user embeddings system identifies user embeddings in multi-dimensional vector space that are close in distance to user embeddings of users in the base user segment. In some embodiments, the user embeddings system employs cosine similarity to determine the distance between user embeddings in the multi-dimensional vector space.

Accordingly, the graphical user interface can include selectable options that allow a user (e.g., an administrator) to make selections to expand a base user segment. For example, the user embeddings system enables the user to select a user embedding type when expanding a user segment. A user embeddings type corresponds to the type of user data and/or the actions used to generate the uniform user embeddings. By selecting a particular (or multiple user embedding types), the user embeddings system can increase the accuracy of identifying an expanded user segment that matches desired attributes of base users. As described further below, user embedding types can include user interaction embeddings, user trait embeddings, or other types of user embeddings.

In addition, the graphical user interface can include options to expand a base user segment based on a user similarity expansion metric. A user similarity expansion metric (or "similarity metric") represents the approach taken by the user embeddings system to determine holistically similar or look-alike users. For example, one similarity metric is a desired number of users. For instance, the user (e.g., the administrator) indicates the number of additional similar users (per user or for the user segment as a whole) to include in an expanded user segment. In another example, the similarity metric corresponds to a distance or similarity range. For instance, the user embeddings system expands the base user segment to include additional users having user embeddings with a distance within a particular threshold of user embeddings of base users in the base user segment.

In one or more embodiments, the user embeddings system provides functionality to emphasize users in, or prune users from, a base or expanded user segment. To illustrate, the user embeddings system can generate a second visualization that shows user characteristics (e.g., traits or attributes) of users in an expanded user segment. For example, the user embeddings system provides a chart or graph in a second visualization that summarizes the most prominent user characteristics found among the expanded user segment. In some embodiments, the user embeddings system receives a selection of a user characteristic and removes users from the expanded user segment that have the selected characteristic. In this manner, the user embeddings system enables a user (e.g., an administrator) to prune out unwanted users that could decrease the similarity accuracy of the expanded user segment. Similarly, as described below, in various embodiments, the user embeddings system can emphasize or prioritize users in the expanded user segment that have a desired characteristic.

As mentioned above, the user embeddings system utilizes user embeddings to accurately and efficiently expand a base user segments. For example, the user embeddings system generates uniform user embeddings using a trained neural network and structured user data. In one or more embodiments, to obtain structured user data, the user embeddings system organizes user profile data into a hierarchy structure according to content type, interaction type, and associated timestamps. In some embodiments, the user embeddings system obtains structured user data by converting user profile data into user trait sequences that encode user trait changes based on timestamps. Detail regarding obtaining/generating structured user data is provided below.

Furthermore, the user embeddings system can train and employ a neural network utilizing the structured user data. For example, in one or more embodiments, the user embeddings system trains and utilizes an interaction-to-vector neural network to generate the user embeddings (e.g., user interaction embeddings). In additional, or alternative embodiments, the user embeddings system trains and utilizes an LSTM autoencoder neural network trained to generate user embeddings (e.g., user trait embeddings). Still on other embodiments, the user embeddings system utilizes another type of neural network to generate uniform user embeddings from user profile data.

The user embeddings system provides many advantages and benefits over conventional systems and methods. As mentioned above, the user embeddings system accurately and efficiently expands user segments in an automatic manner. For example, unlike conventional systems that employ rigid rule-based segmentation tools that require users to conform to a specific set of rules, the user embeddings system provides a flexible approach that holistically compares users to each other. Indeed, the user embeddings system improves accuracy by comparing users based on the user's complete profile, history, and experiences rather than if the user satisfies a set of characteristics. In this manner, similar users that conventional systems often exclude from a user segment are included, and dissimilar users that conventional systems often include in the user segment are excluded.

As a result of generating expanded user segments that are more accurate than conventional systems, the user embeddings system further improves computer efficiency and reduces wasting of computing resources. For example, by more accurately and precisely identifying relationships between user embeddings among users, the user embeddings system can reduce computing resources (e.g., processing power and bandwidth) required to generate, distribute, and monitor digital content to disinterested users.

In another example, the user embeddings system efficiently encodes user data (i.e., user profile data) created by user interactions and behavior changes into uniform representations. By transforming the irregular and imbalanced user profile data into a structured user data, the user embeddings system can more accurately determine the effects, weights, and influences resulting from the complex interactions and behaviors of users. Specifically, the user embeddings system can utilize latent relationships hidden in user data to train a neural network to accurately learn and encode uniform user embeddings for users.

As a further benefit, embodiments of the user embeddings system provide a graphical user interface that facilitates automatically expanding user segments such that users naturally, efficiently, and accurately interact with the user segments. In this manner, the user embeddings system reduces the number of manual steps and various interfaces a user would previously have to encounter in attempts to expand a user segment. In addition, the user embeddings system provides various tools and features that enable a user to customize a user segment from a single graphical user interface. Moreover, as a further benefit, the user embeddings system flexibly adapts the graphical user interface to various types of client devices, especially client devices with small screens to enhance a user's experience for a particular device type.

As illustrated by the foregoing discussion, the present disclosure utilizes a variety of terms to describe features and advantages of the user embeddings system. Additional detail is now provided regarding the meaning of such terms. For example, as used herein, the term "content" refers to digital data that may be transmitted over a network. In particular, the term "content" includes items (e.g., content items) such as text, images, video, audio and/or audiovisual data. Examples of digital content include images, text, graphics, messages animations, notifications, advertisements, reviews, summaries, as well as content related to a product or service.

In addition, the term "user profile data" (or "user data") or refers to information and data associated with a user. For example, the term "user data" includes attributes, characteristics, interactions, traits, and facts corresponding to a user. Along similar lines, the term "user trait" refers to an attribute or characteristic associated with a user that indicate changeable characteristics describing the nature and disposition of a user. Also, the term "user interaction" (or "interaction") refers to a point of contact between a user and a content item, such as user contact with respect to a content item corresponding to a product or service offered by an entity, such as an individual, group, or business.

Moreover, the term "structured user data," as used herein, refers to user data arranged in an organized manner. For instance, the term "structured user data" includes user interaction data organized in a hierarchical manner and user trait sequences. For example, a user trait sequence includes a series of user trait state changes between two or more time points (e.g., timestamps). Additional examples of obtaining and generating structured user data are provided below.

As mentioned above, the user embeddings system can train a neural network to learn user embeddings. As used herein, the terms "user embeddings" or "user embedding representations" refer to a vector of numbers/features that represent the behavior of the user encoded in a pre-defined dimension. The features can be learned by the neural network. In one or more embodiments, the features comprise latent features. In various embodiments, the number/predefined dimension of representative features in a user embedding (e.g., 16 features) can be a hyperparameter of the network and/or learned throughout training the neural network. In addition, user embeddings can include multiple user embedding types. Examples of user embedding types include user interaction embeddings and user trait embeddings, as further described below.

In some embodiments, the user embeddings system displays user segments of user embeddings in a visualization. As used herein, the term "user segment" (or "segments of users") refers to one or more users from a group of users. In particular, the term "user segment" refers to a subset of users represented by corresponding user embeddings. A "base user segment" refers to an initial group of users that make up a user segment based on the base users in the user segment having one or more qualifying traits, interactions, characteristics, and/or attributes. An "expanded user segment" refers to an enlarged user segment where additional users have been added to a base user segment.

In various embodiments, the user embeddings system increases the number of users in a base user segment based on a user similarity metric. As used herein, the term "user similarity expansion metric" (or "user similarity metric") refers to a parameter-based function used to identify additional users to include in an expanded user segment. In some cases, the term "user similarity metric" includes an actual or intended number of users to add to a base user segment, such as a user similarity metric corresponding to a number of users. In other embodiments, the term "user similarity metric" includes some or all users within a similarity distance of one or more users in a base user segment, as further described below.

The term "visualization," as used herein, refers to a graphical depiction of a user segment or an expanded user segment. In particular, the term "visualization" refers to a chart, graph, plot or other visual depiction of a user segment. In some embodiments, the user embeddings system reduces the dimensionality of user embeddings in a user segment to two or three dimensions to display the user segment within a graphical user interface of a computing device.

As mentioned above, the user embeddings system can train a neural network to learn uniform user embeddings. The term "machine learning," as used herein, refers to the process of constructing and implementing algorithms that can learn from and make predictions on data. In general, machine learning may operate by building models from example inputs (e.g., user interaction data), such as training neural network layers and/or matrices, to make data-driven predictions or decisions. Machine learning can include neural networks (e.g., the interaction-to-vector neural network, an LSTM encoder or decoder neural network), cells (e.g., LSTM cells), data-based models (e.g., an LSTM autoencoder model), or a combination thereof.

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using semi-supervisory data to tune parameters of the neural network.

In addition, the term "interaction-to-vector neural network" refers to a neural network that includes an input layer, a hidden layer, and an output layer as well as one or more hidden weighted matrices between each of the layers. In various embodiments, the interaction-to-vector neural network also includes a classification layer and a loss layer. In some embodiments, the interaction-to-vector neural network is a word2vec machine-learning model. In additional embodiments, the interaction-to-vector neural network utilizes a skip-gram architecture during training to learn weights and tune the hidden weighted matrices. Additional detail regarding the interaction-to-vector neural network is provided below in connection with FIGS. 6A-6B.

In addition, the term "long short-term memory neural network" (or "LSTM network") refers to a neural network that is a special type of recurrent neural network (RNN). An "LSTM network" includes a cell having an input gate, an output gate, and a forget gate as well as a cell input. In various embodiments, the cell remembers previous states and values over time (including hidden states and values) and the three gates control the amount of information that is input and output from a cell. In many embodiments, an LSTM network includes various cells.

Further, the user embeddings system can create, train, and utilize an LSTM autoencoder model. As used herein, the terms "LSTM autoencoder model" or "sequence-to-sequence LSTM autoencoder model" refer to a neural network made up of multiple LSTM networks. In particular, the term "LSTM autoencoder model," as used herein, refers to a neural network that includes an LSTM encoder network (or "encoder") and an LSTM decoder network (or "decoder"), where the encoder provides one or more inputs to the decoder.

Further, as used herein, the term "digital content campaign" (or "content campaign") refers to providing content to one or more users via one or more communication media. In particular, the term "content campaign" includes an operation for providing content for a client (e.g., an advertiser) to computing devices of a target audience of users (e.g., a base user segment or an expanded user segment) over time. For example, a content campaign can include providing content focused on a product or product category to a variety of different audience users over a period of time.

Referring now to the figures, FIG. 1 illustrates a diagram of an environment 100 in which the user embeddings system 104 can operate. As shown in FIG. 1, the environment 100 includes a server device 101, user client devices 110a-110n, and an administrator client device 114. In addition, the environment 100 includes a third-party server device 108 (e.g., one or more webservers). Each of the devices within the environment 100 can communicate with each other via a network 112 (e.g., the Internet).

Although FIG. 1 illustrates a particular arrangement of components, various additional arrangements are possible. For example, the third-party server device 108 communicates directly with the server device 101. In another example, the third-party server device 108 is implemented as part of the server device 101 (shown as the upper dashed line). Likewise, the administrator client device 114 can also be implemented as part of the server device 101 (shown as the lower dashed line)

In one or more embodiments, users associated with the user client devices 110a-110n can access content items provided by the analytics system 102 and/or the third-party server device 108 via one or more media channels (e.g., websites, applications, or electronic messages). As FIG. 1 illustrates, the environment 100 includes any number of user client devices 110a-110n.

As shown, the server device 101 includes an analytics system 102, which can track the storage, selection, and distribution of content items as well as track user interactions with content via the user client devices 110a-110n. The server device 101 can be a single computing device or multiple connected computing devices. In one or more embodiments, the analytics system 102 facilitates serving content to users (directly or through the third-party server device 108) via one or more media channels to facilitate interactions between the users and the content.

In some embodiments, the analytics system 102 includes, or is part of, a content management system that executes various digital content campaigns across multiple digital media channels. Indeed, the analytics system 102 can facilitate digital content campaigns including audiovisual content campaigns, online content item campaigns, email campaigns, social media campaigns, mobile content item campaigns, as well as other campaigns. In various embodiments, the analytics system 102 manages advertising or promotional campaigns, which includes targeting and providing content items via various digital media channels in real time to large numbers of users (e.g., to thousands of users per second and/or within milliseconds of the users accessing digital assets, such as websites).

In one or more embodiments, the analytics system 102 employs the user embeddings system 104 to facilitate the various digital content campaigns. In alternative embodiments, the analytics system 102 hosts (or communicates with) a separate content management system (e.g., a third-party system) that manages and facilitates various digital content campaigns. In these embodiments, the analytics system 102 can communicate user embeddings to aid the third-party system with analytics, targeting, segmentation, or other data analysis.

As shown in FIG. 1, the analytics system 102 includes the user embeddings system 104. The user embeddings system 104 also includes user segments 106. As described above, the expanded user segments 106 include groupings of users along with corresponding user embeddings. In particular, each user segment in the expanded user segments 106 includes an initial set of users (e.g., base users) and additional users automatically identified by the user embeddings system 104 based on similarity to the base users.

As mentioned above, the user embeddings system 104 can generate uniform user embeddings from the user profile data by utilizing a trained neural network. Further, in various embodiments, the user embeddings system 104 automatically expands a base user segment to include additional holistically similar users based on user embeddings. Further, in additional embodiments, the user embeddings system 104 provides a user-manipulatable graphical user interface that enables a user (e.g., an administrator using the administrator client device 114) to define parameters that the user embeddings system 104 utilizes to determine which additional users to include in an expanded user segment. To illustrate, a high-level description of the user embeddings system 104 is provided with respect to FIG. 2. FIGS. 3A-9 provide further detail regarding the user embeddings system 104.

As mentioned above, the environment 100 includes the user client devices 110a-110n. The analytics system 102 (or the third-party server device 108) can provide content to, and receive indications of user interactions from, the user client devices 110a-110n. In various embodiments, the analytics system 102 communicates with the third-party server device 108 to provide content to the user client devices 110a-110n. For instance, the analytics system 102 instructs the third-party server device 108 to employ specific media channels when next providing content to target users based on the user embeddings in an expanded user segment (e.g., using the user embeddings to make content distribution predictions).

In one or more embodiments, the user client devices 110a-110n and/or server device 101 may include, but are not limited to, mobile devices (e.g., smartphones, tablets), laptops, desktops, or any other type of computing device, such as those described below in relation to FIG. 10. In addition, the third-party server device 108 (and/or the server device 101) can include or support a web server, a file server, a social networking system, a program server, an application store, or a digital content provider. Similarly, the network 112 may include any of the networks described below in relation to FIG. 10.

The environment 100 also includes the administrator client device 114. An administrator user (e.g., an administrator, content manager, or publisher) can utilize the administrator client device 114 to manage a digital content campaign. For example, a content manager via the administrator client device 114 can provide content and/or campaign parameters (e.g., targeting parameters, target media properties such as websites or other digital assets, budget, campaign duration, or bidding parameters). Moreover, the content manager via the administrator client device 114 can view digital content based on learned user embeddings. For example, with respect to a digital content campaign, the administrator employs the administrator client device 114 to access the user embeddings system 104 and view graphical user interfaces that include user segment visualization across one or more digital content campaigns.

With respect to obtaining user interaction data, in one or more embodiments the analytics system 102 and/or the user embeddings system 104 monitors various user interactions, including data related to the communications between the user client devices 110a-110n and the third-party server device 108. For example, the analytics system 102 and/or the user embeddings system 104 monitors interaction data that includes, but is not limited to, data requests (e.g., URL requests, link clicks), time data (e.g., a timestamp for clicking a link, a time duration for a web browser accessing a webpage, a timestamp for closing an application, time duration of viewing or engaging with a content item), path tracking data (e.g., data representing webpages a user visits during a given session), demographic data (e.g., an indicated age, sex, or socioeconomic status of a user), geographic data (e.g., a physical address, IP address, GPS data), and transaction data (e.g., order history, email receipts).

The analytics system 102 and/or the user embeddings system 104 can monitor user data in various ways. In one or more embodiments, the third-party server device 108 tracks the user data and then reports the tracked user data to the analytics system 102 and/or the user embeddings system 104. Alternatively, the analytics system 102 and/or the user embeddings system 104 receives tracked user data directly from the user client devices 110a-110n. In particular, the analytics system 102 and/or the user embeddings system 104 may receive user information via data stored on the client device (e.g., a browser cookie, cached memory), embedded computer code (e.g., tracking pixels), a user profile, or engage in any other type of tracking technique. Accordingly, the analytics system 102 and/or the user embeddings system 104 can receive tracked user data from the third-party server device 108, the user client devices 110a-110n, and/or the network 112.

Based on receiving user data (i.e., user profile data), in various embodiments, the user embeddings system 104 can generate structured user data. For example, in some embodiments, the user embeddings system 104 generates a hierarchy from the user data by organizing the user profile data by content item type, then interaction type, then interaction time. In another example, the user embeddings system 104 generates a user traits sequence from the user data that encodes user trait changes associated with time. Additional description of generating structured user data is provided below with respect to FIGS. 6A-7B.

Figure 2:
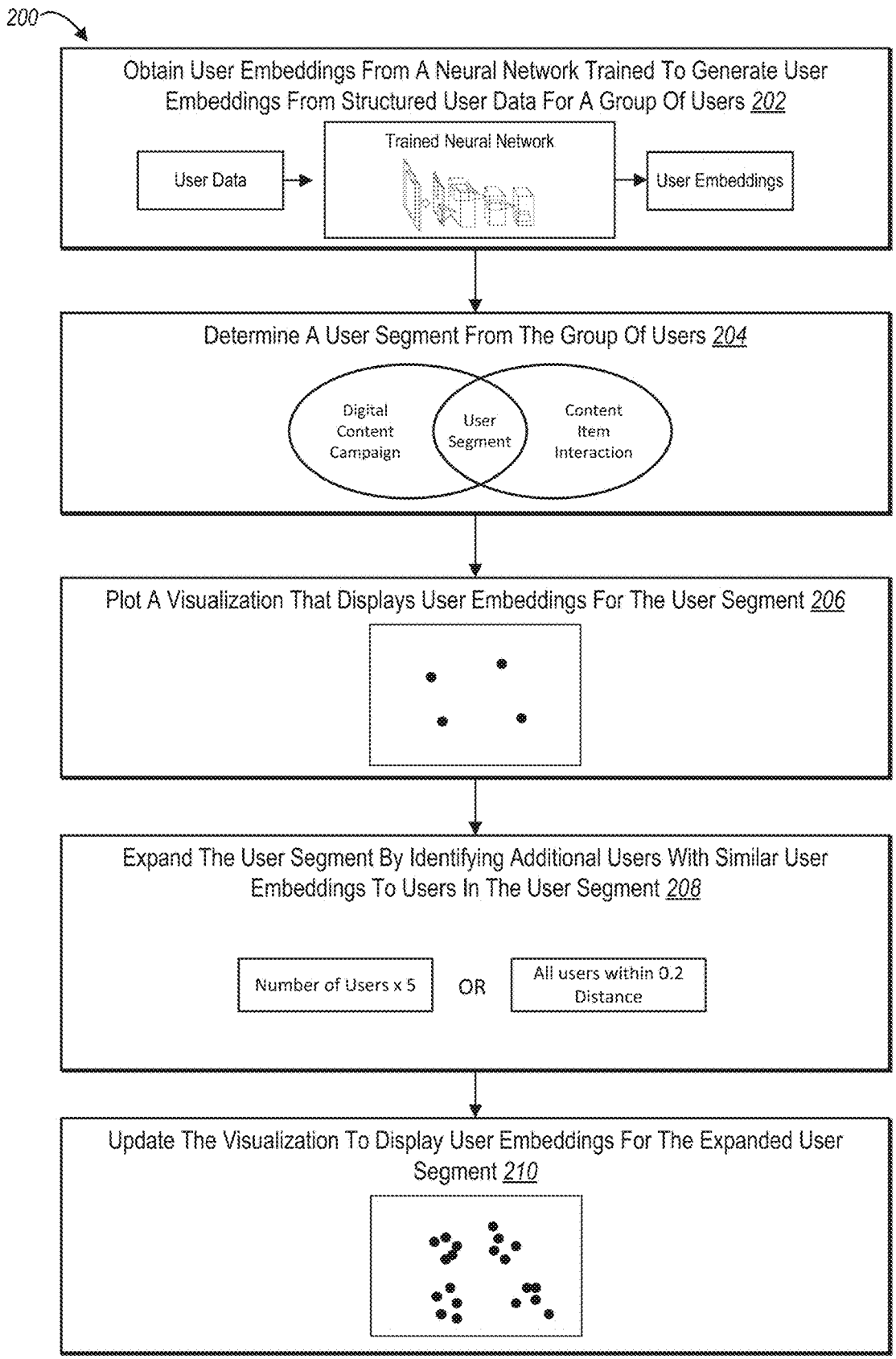
FIG. 2 illustrates a high-level schematic diagram of providing and then expanding a user segment that based on user-provided parameters in accordance with one or more embodiments.

Turning now to FIG. 2, an overview is provided regarding how the user embeddings system 104 expands a user segment using generated user embeddings. In particular, FIG. 2 illustrates a general process 200 of learning user embeddings from user data utilizing a trained neural network and expanding a user segment utilizing the user embeddings. In one or more embodiments, the user embeddings system 104 described with respect to FIG. 1 implements the general process 200 of expanding a user segment utilizing generated user embeddings.

As shown in FIG. 2, the user embeddings system 104 obtains or generates 202 user embeddings from or using a neural network trained to generate user embeddings from structured user data. For example, in one or more embodiments, the user embeddings system 104 uses an interaction-to-vector neural network to generate user interaction embeddings. In some embodiments, the user embeddings system 104 uses an LSTM autoencoder model to generate user trait embeddings. In other embodiments, the user embeddings system 104 uses another type of neural network to generate uniform user embeddings based on the user profile data, or a combination of the above. For example, an analytics system, a third-party server device, and/or a user client device can provide user embeddings to the user embeddings system 104.

As mentioned above, in some embodiments, obtaining the user embeddings involves training a neural network as well as utilizing the trained neural network to generate user embeddings. As shown in FIG. 2, the trained neural network generates user embeddings from user profile data (which may be first transformed into user structured data). Additional description regarding training and utilizing various neural networks is provided with respect to FIGS. 6A-7B.

As illustrated in FIG. 2, the user embeddings system 104 determines 204 a user segment from the group of users. For example, in one or more embodiments, the user embeddings system 104 employs rules or criteria to identify an initial set of users (e.g., base users) to include in a base user segment, such as users that interacted with a content item from a digital content campaign, as shown. As another example, the user embeddings system 104 identifies the base user segment by identifying users that possess a particular trait or trait change. Additional description regarding identifying an initial user segment is provided with respect to FIG. 3A.

FIG. 2 also shows the user embeddings system 104 plotting 206 a visualization that displays user embeddings for the user segment (e.g., the base user segment). For example, the user embeddings system 104 plots the user embeddings system 104 for each user within a scatter plot or in another type of graph. Further, the user embeddings system 104 provides the visualization to a client device (e.g., the administrator client device 114) within a graphical user interface. In some embodiments, the user embeddings system 104 reduces the dimensionality of the user embeddings (e.g., to three-dimensions) to allow for the user embeddings to be displayed on a client device in a readily understandable way. Examples of visualizations are provided in FIGS. 3A-4C.

In addition, the user embeddings system 104 expands 208 the user segment (e.g., the base user segment) by identifying additional users with similar user embeddings to users in the user segment. For example, upon receiving a request to expand the base user segment, the user embeddings system 104 identifies the user embeddings of one or more base users in the base user segment. For the one or more base users, the user embeddings system 104 compares their user embeddings to user embeddings of other users in the group of users who are not currently in the user segment (e.g., potential additional users). For potential additional users having user embeddings within a threshold similarity (e.g., defined by a similarity metric) to the base users, the user embeddings system 104 adds the identified users to the base user segment, thus, creating an expanded user segment.

As mentioned above, the threshold similarity can be represented by a similarity metric, such as a number of users or a similarity distance. Further, a user can select an amount for each similarity metric to further define the expansion size of a user segment. In additional embodiments, the expanded user segment also allows users to prune out individual users or groups of users in the base user segment and/or expanded user segment that possess unwanted user characteristics. Additional description regarding expanding a user segment is provided below with respect to FIGS. 3A-5B.

Moreover, once a user segment is expanded, the user embeddings system 104 can update the visualization. To illustrate, FIG. 2 shows the user embeddings system 104 updating 210 the visualization to display user embeddings for the expanded user segment. In particular, the user embeddings system 104 updates the visualization to include the initial group of base users along with the additional identified users. Further, in some embodiments, the user embeddings system 104 also removes or hides users that have unwanted user characteristics indicated by the user (e.g., the administrator). As mentioned above, examples of visualizations, including expanded user segments, are provided in FIGS. 3A-4C.

Turning now to FIGS. 3A-3F, additional detail is provided regarding expanding a user segment based on uniform user embeddings. More specifically, FIGS. 3A-3F illustrate diagrams of the user embeddings system 104 automatically expanding and modifying a base user segment based on a user (e.g., an administrator) requesting segment expansion and/or modifying expansion parameters. As shown, FIGS. 3A-3F include a client device 300 having a graphical user interface 302. The client device 300 can represent the administrator client device 114 described above in connection with FIG. 1.

As shown, the graphical user interface 302 in FIGS. 3A-3F includes a user embeddings visualization 304 that displays a user segment. In addition, the graphical user interface 302 includes user-selectable options that provide expansion parameters to the user embeddings system 104 when expanding a user segment (e.g., a base user segment). As shown, expansion parameters include a user embeddings type 306, a similarity metric 308, and a similarity metric amount 310. Further, the graphical user interface 302 also includes user segment statistics 312 included below the user embeddings visualization 304.

Figure 3A:
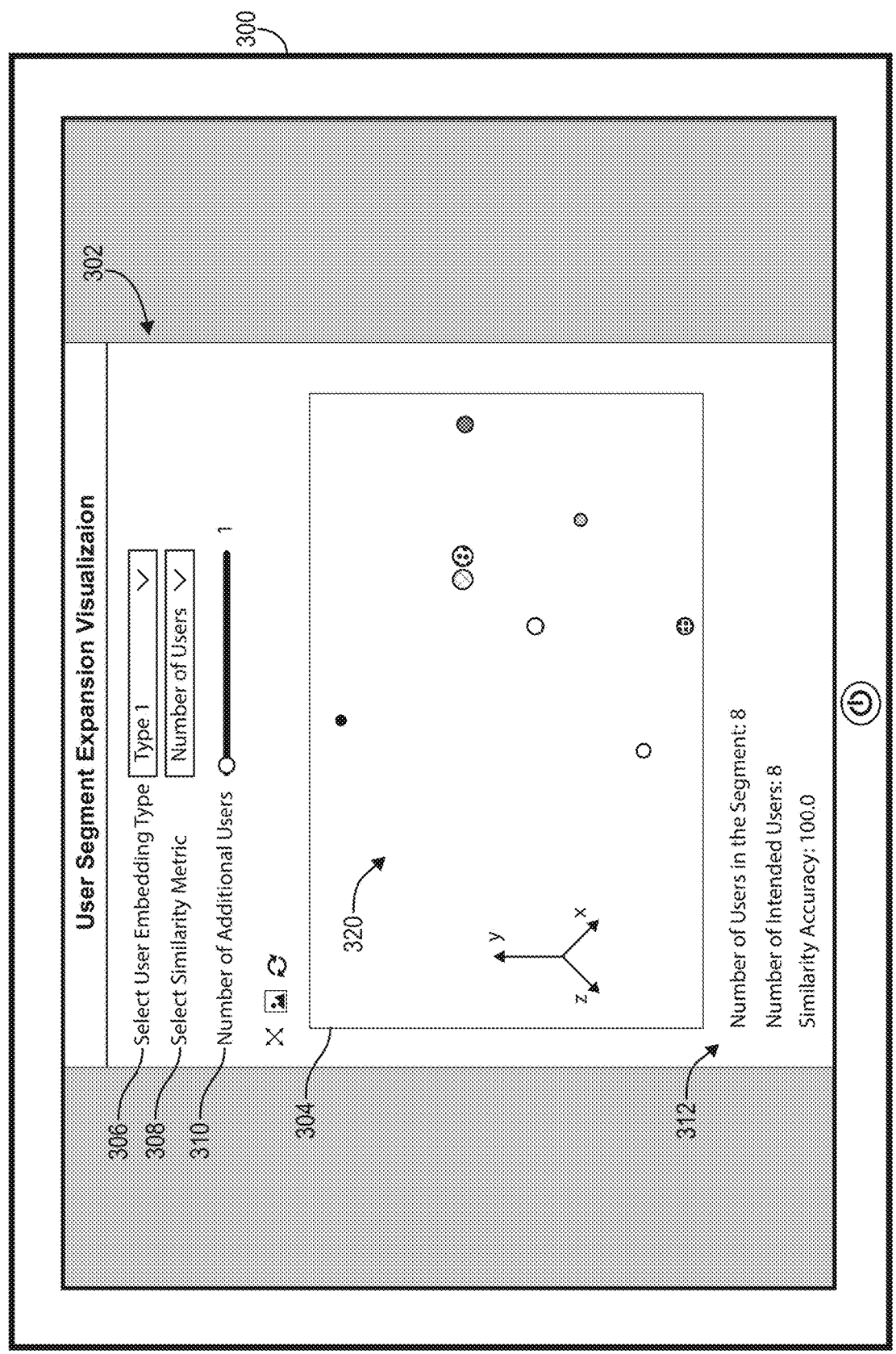
FIGS. 3A-3F illustrate diagrams of graphical user interfaces for automatically expanding and modifying a user segment based on user-provided parameters in accordance with one or more embodiments.
Figure 3B:
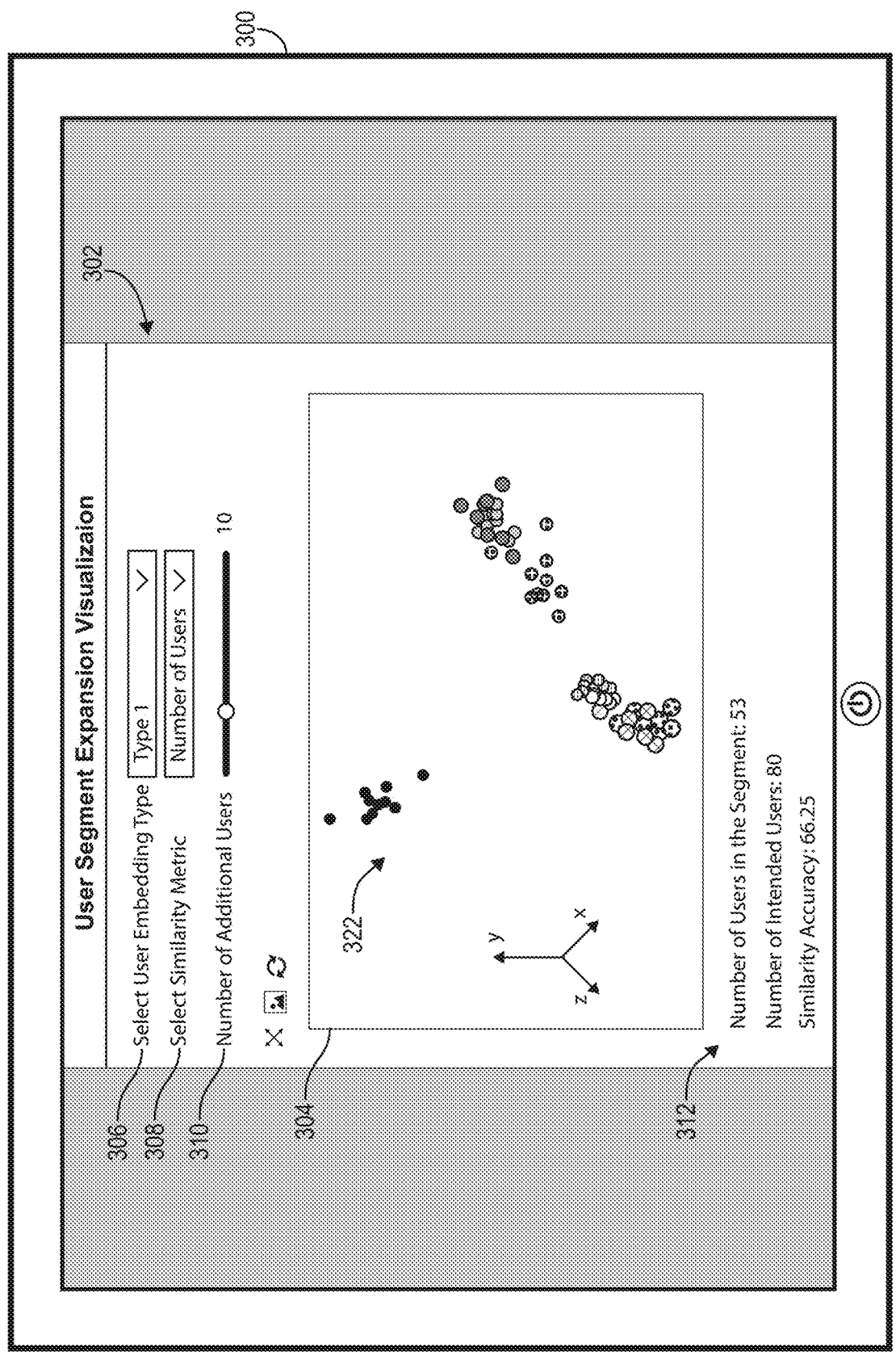
Figure 3C:
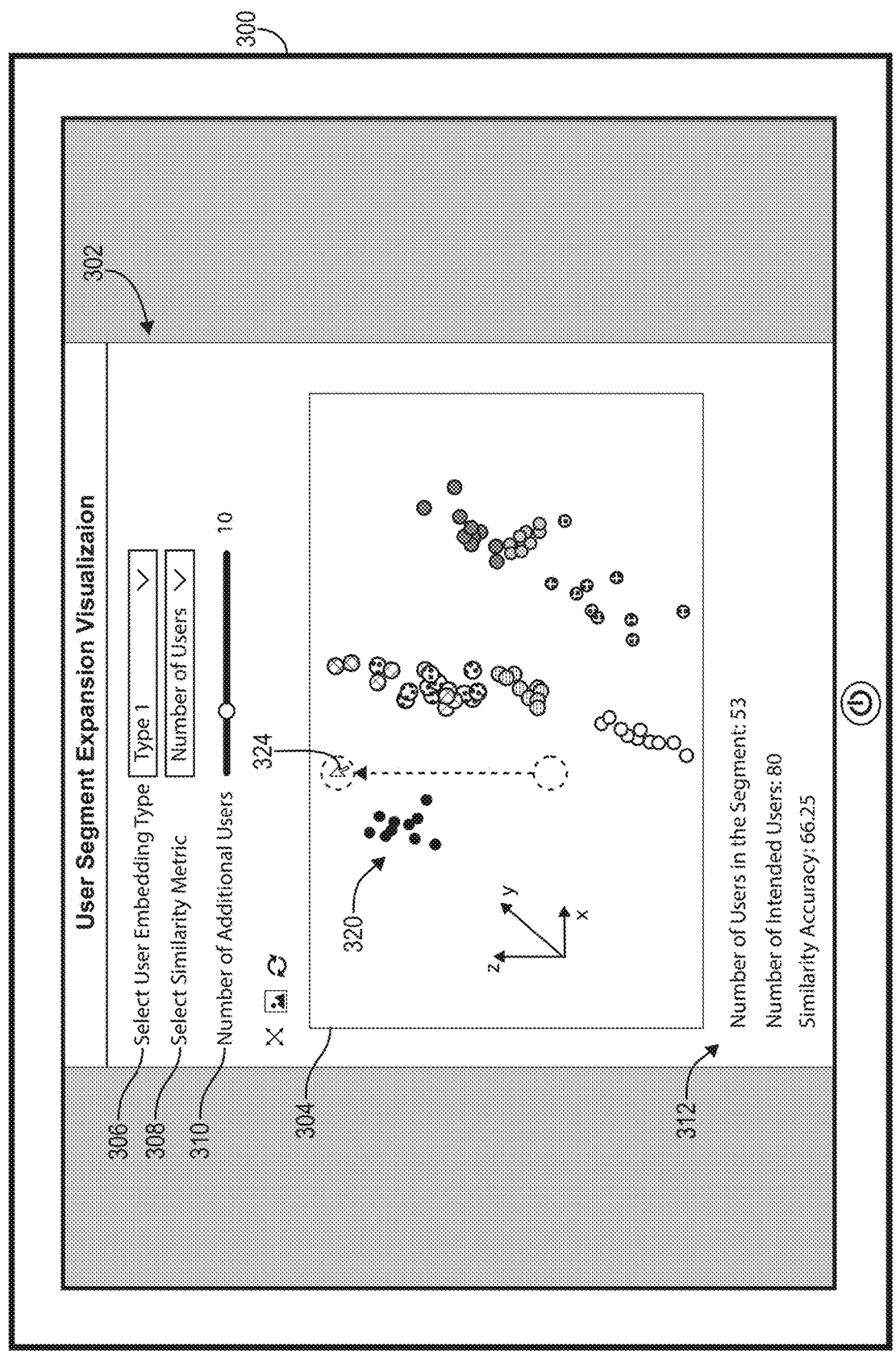
Figure 3D:
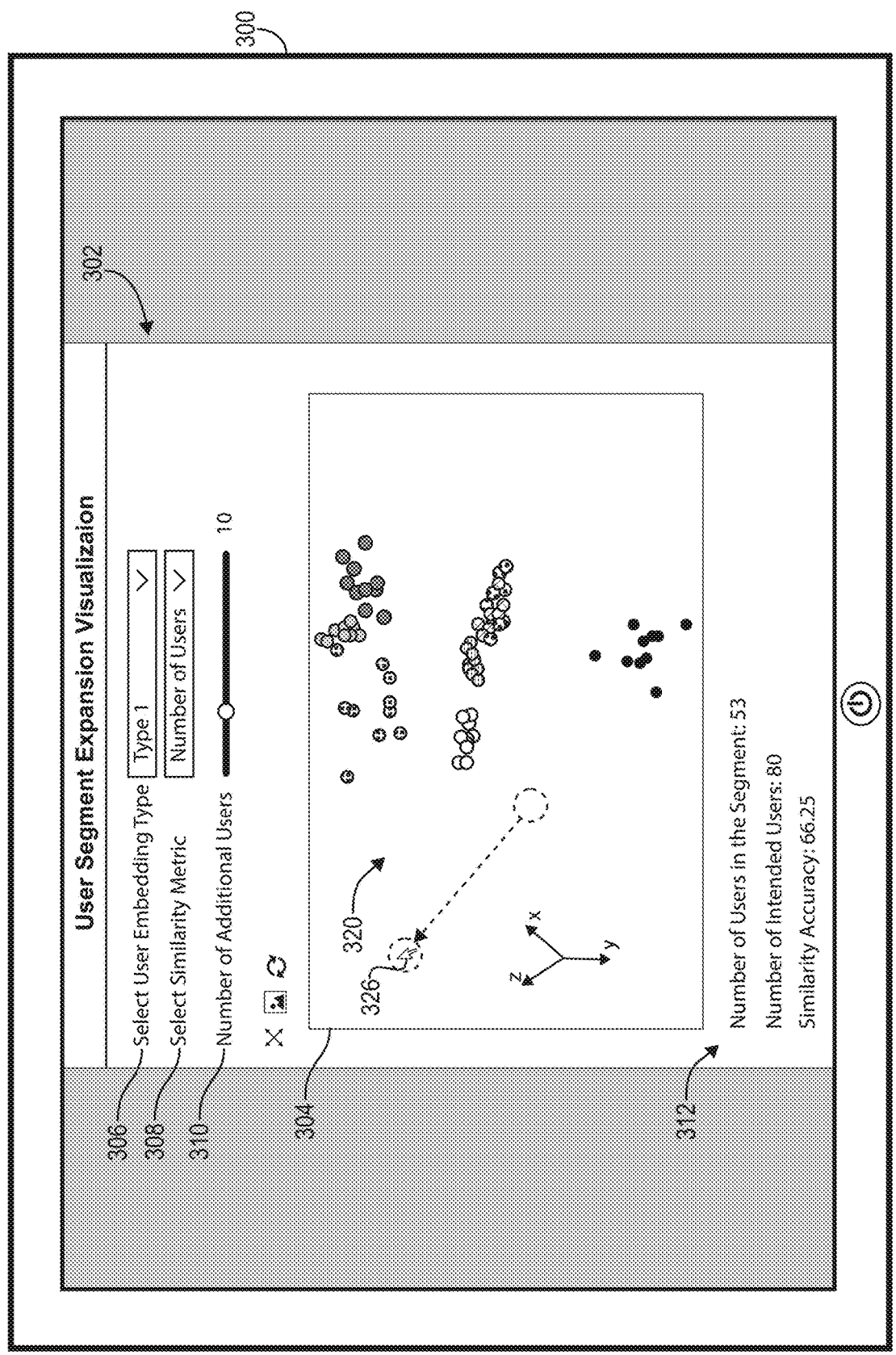
Figure 3E:
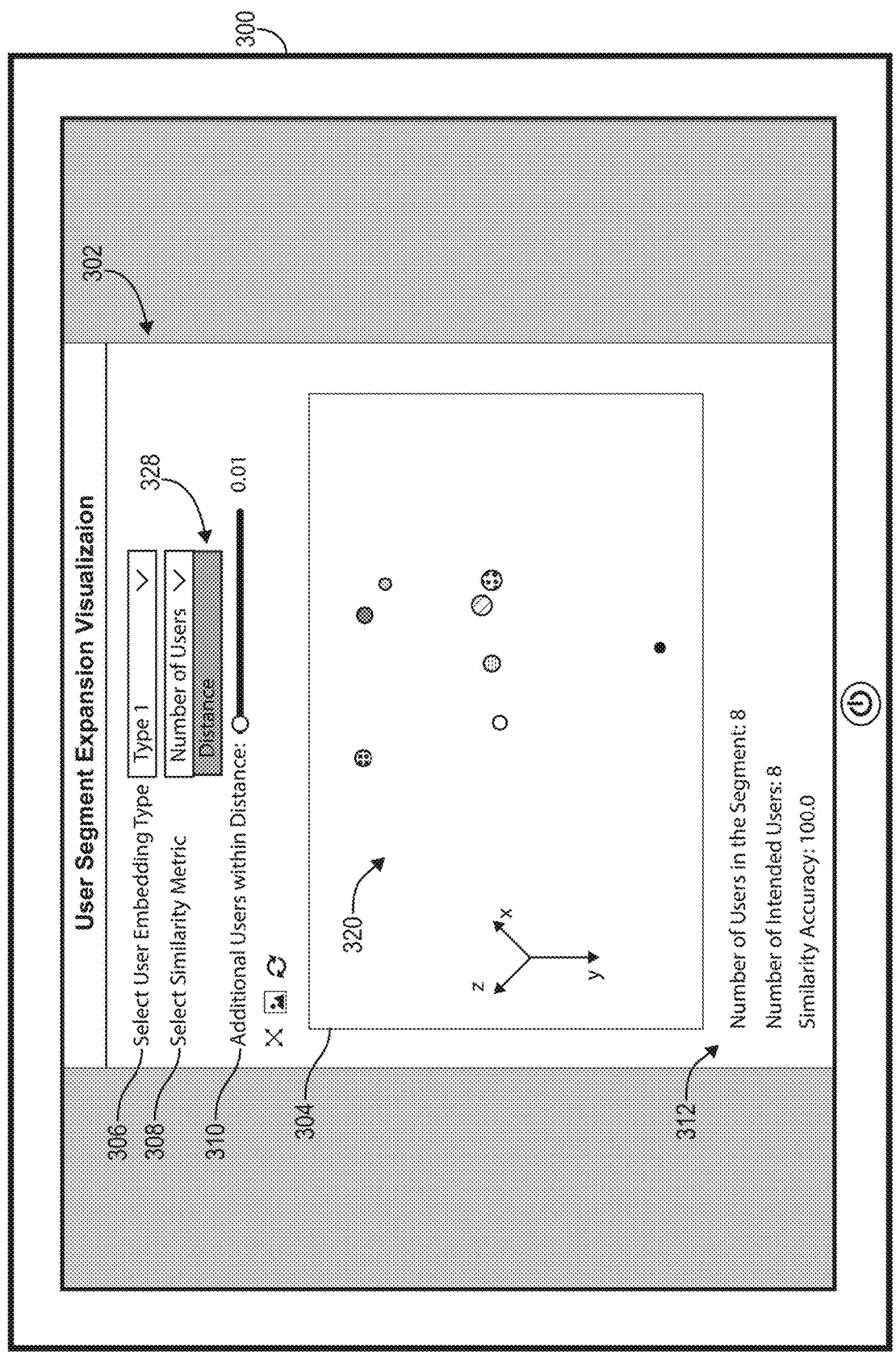
Figure 3F:
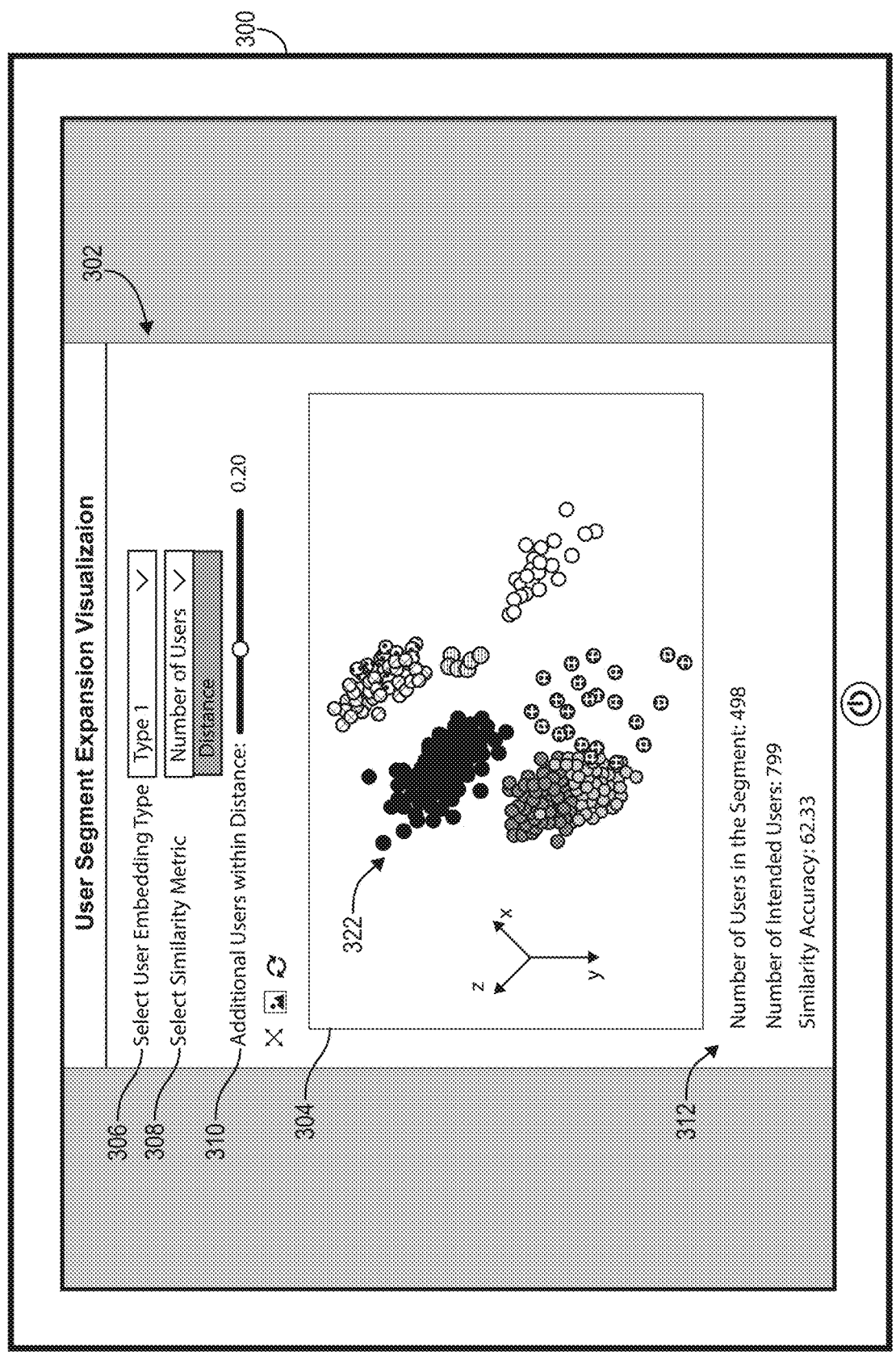

As an overview, FIG. 3A shows a base user segment plotted within the user embeddings visualization 304. FIG. 3B shows expanding the base user segment in response to receiving a selection of expansion parameters. FIGS. 3C-3D shows the user embeddings system 104 updating the plot of user embeddings based on the user manipulating the user embeddings visualization 304. FIG. 3E-3F show the user embeddings system 104 expanding the base user segment based detecting additional configuration selections of expansion parameters.

As illustrated, FIG. 3A shows the user embeddings system 104 providing the graphical user interface 302 to the client device 300 that includes a user embeddings visualization 304 displaying user embeddings from a user segment. More particularly, the user embeddings visualization 304 plots user embeddings in a base user segment 320. In various embodiments, the base user segment 320 represents an initial user segment before expansion. For example, a user (e.g., an administrator) provides the user embeddings system 104 with one or more selected user parameters or conditions (e.g., user characteristics, traits, attributes, and/or actions) that define which users (e.g., base users) to include in the base user segment 320.

To illustrate, the user provides instructions to the user embeddings system 104 to add all users from a digital content campaign that interacted with a particular content item to a base user segment. For example, the user instructs the user embeddings system 104 to include all users that redeemed a discount, watched a video, downloaded a mobile application, or purchased a product. In some embodiments, the user provides one or more combinations of conditions to employ when including users in the base user segment 320.

In some embodiments, the user selects one of many rules that define which users from a group of users to include in a base user segment. The rules can be predefined or customized by the user. An example rule includes users who have realized a particular set of traits and/or users that have interacted with multiple digital content campaigns. Further, the rules can correspond to one or many digital content campaigns and/or groups of users. For each group of users, however, the user embeddings system 104 has corresponding generated user embeddings for the users that can be plotted in the user embeddings visualization 304 and used for comparison to other users in the group.

As mentioned above, the graphical user interface includes the expansion parameters including a user embeddings type 306, a similarity metric 308, and a similarity metric amount 310. In one or more embodiments, the user embeddings system 104 provides default selections for one or more of the expansion parameters, which can be user-defined. For example, as shown in FIG. 3A, the user embeddings type 306 is selected as "Type 1," the similarity metric 308 is selected as "Number of Users," and the similarity metric amount 310 has a value of "1."

In various embodiments, the user embeddings type 306 provides an option for the user to select one or more user embedding types to include when identifying the base user segment 320 and expanding the user segment. Different user embedding types generally correspond to the particular type of user data and/or the actions used to generate the corresponding user embeddings. As mentioned above, by selecting a particular (or multiple user embeddings type), the user embeddings system increases the accuracy of identifying an expanded user segment.

To illustrate, a first type of user embeddings corresponds to user interaction embeddings. The user embeddings system 104 generates user interaction embeddings based on interaction data between users and content (e.g., user behavioral engagement data), as further described below. Thus, a user desiring to identify an expanded segment of users that accurately depicts how those users will react to content, the user may select user interaction embeddings as the user embeddings type 306. Another type of user embeddings corresponds to user trait embeddings. The user embeddings system 104 can generate user trait embeddings based on how user traits change over time. Thus, a user desiring to identify an expanded segment of users that focuses on qualities and characteristics of a user may select user trait embeddings as the user embeddings type 306.

In addition, the selected user embeddings type 306 can define the user embeddings included in the base user segment 320. For example, if "Type 1" of the user embeddings type 306 corresponds to user interaction embeddings, then the user embeddings system 104 defines the base user segment 320 using generated user interaction embeddings. Similarly, if "Type 1" of the user embeddings type 306 corresponds to user traits embeddings, then the user embeddings system 104 defines the base user segment 320 using generated user traits embeddings.

The similarity metric 308 (e.g., similarity expansion metric) and the corresponding similarity metric amount 310, in various embodiments, provide an option for the user to select how to expand a user segment (e.g., the base user segment 320 or a previously expanded user segment) and to what extent. The user embeddings system 104 can provide various similarity metrics, such as number of users, similarity distance, and/or similarity percentage. In addition, the user embeddings system 104 can provide one or more similarity metric amounts or thresholds that correspond to the similarity metric 308, as shown below.

As shown in FIG. 3A, the graphical user interface 302 displays the similarity metric 308 of "Number of Users" (e.g., a first similarity expansion metric). In connection with the selection of the "Number of Users," the graphical user interface 302 also includes the similarity metric amount 310 corresponding to the number of additional users to include when expanding the user segment. Upon increasing the similarity metric amount 310, the user embeddings system 104 will compare the user embeddings of base users in the base user segment 320 to user embeddings from the group of users to identify holistically similar or "look-alike" users to the base users. In this manner, the user embeddings system 104 can expand a base user segment to capture additional users similar to the base users that conventional systems largely fail to include.

In some embodiments, the similarity metric amount 310 is per base user, meaning if the user selects the similarity metric amount of 3, the user embeddings system 104 will identify three holistically similar users for each base user. In this manner, each base user forms the center of a cluster of holistically similar users. In some embodiments, the user embeddings system 104 includes the base user in the per-user/per-base-user similarity expansion amount, as shown in FIG. 3B, which is described below.

In additional embodiments, the user embeddings system 104 may be unable to identify the requested number of additional user embeddings because the set of user embeddings does not include a sufficient number of user embeddings (i.e., there aren't enough similar users). In some embodiments, the user embeddings system 104 applies an additional minimum similarity threshold to exclude user segment that are beyond a similarity threshold distance to a base user. Indeed, if the next closest additional user to the base user is too far away (e.g., based on a radial distance or a Euclidean radius distance in vector representation space), then the user embeddings system 104 determines that the additional user is not similar enough to the base user to be grouped to the user and/or included in the expanded user segment.

The user embeddings system 104 can determine the distance between two user embeddings within a vector representation space. For example, in some embodiments, each user embedding is a vector defined in a high-dimensional space. In these embodiments, the user embeddings system 104 can utilize a cosine similarity comparison and/or dot product formulation to determine the distance between each corresponding feature of the two user embeddings. Further, the user embeddings system 104 can determine the total combined distance between all of the features from the two user embeddings.

Indeed, two user embeddings that are similar to each other will have a smaller similarity distance in the vector representation space. Correspondingly, as the overall or holistic similarity between two user embeddings diminish, the similarity distance will increase. Further, in various embodiments, when the distance between two user embeddings surpasses a minimum similarity threshold distance (e.g., the largest distance where two embeddings can still be considered alike), the user embeddings system 104 considers the two user embeddings unalike. In some embodiments, the minimum similarity threshold distance is customizable by a user and/or learned through training a corresponding neural network.

In one or more embodiments, the user embeddings system 104 can ignore outlier distances between individual features of two user embeddings. For example, the user embeddings system 104 ignores the set number (e.g., 2 features or 5% of the features) of the largest and/or smallest distances of individual features when determining the similarity distance between two user embeddings base user segment. For example, if a user embedding has twenty features, the user embeddings system 104 discards the largest two feature distances when determining the total similarity distance. In some embodiments, the user embeddings system 104 enables a user to determine the number of individual feature distances to ignore.

As an alternative to the per base user expansion, in some embodiments, the similarity metric amount 310 corresponds to a total number of users. For example, if a base user segment 320 has ten base users and the user selects the similarity metric amount of "4," the user embeddings system 104 identifies the four closest user embeddings from the group of user embeddings to any base users. In some cases, the four additional users are added to the same base user if each of the additional users are closer to the one base users than other additional users are to any other base users. Additional description regarding similarity metric amounts will be provided below in connection with FIG. 3F, which includes a different similarity metric.

As shown, the similarity metric amount 310 is a slider element. However, other selectable graphical elements can equally be employed (e.g., a drop-down, a text entry field, or radio buttons. Further, the user embeddings system 104 can enable a user to define the range or granularity of the similarity metric amount.

As mentioned above, the graphical user interface 302 includes the user segment statistics 312. Generally, the user segment statistics 312 provide a summary of the user segment shown in the user embeddings visualization 304. As shown, the user segment statistics 312 include a number of users in the segment, the number of intended users, and a similarity accuracy. The user embeddings system 104 can include additional or fewer user segment statistics 312 in the graphical user interface 302. Additional detail and context regarding the user segment statistics 312 is further provided below with respect to FIG. 3B.

As mentioned above, the user embeddings are often represented in high-dimensional vector space. Often, computing devices have difficulty displaying data having more than three-dimensions. Thus, in various embodiments, the user embeddings system 104 reduces the dimensionality of the user embeddings to two or three dimensions to enable the user embeddings system 104 to display the user embeddings visualization 304 on the client device 300. As shown, the user embeddings visualization 304 displays a three-dimensional representation of the base user segment 320.

More particularly, in one or more embodiments, the user embeddings system 104 utilizes a machine-learning algorithm to reduce dimensionality of user embeddings in a user segment from high-dimensional space to three-dimensional space. In some embodiments, the user embeddings system 104 performs a distributed Stochastic neighbor embedding, such as t-distributed Stochastic Neighbor Embedding (t-SNE), to reduce dimensionality of the user embeddings in a user segment.

As mentioned above, FIG. 3B illustrates the graphical user interface having an updated user embeddings visualization 304 based on a user modifying the similarity metric amount 310. As shown, the user embeddings visualization 304 displays an expanded user segment 322 that includes additional users added to the base user segment 320 shown in FIG. 3A. For example, the user embeddings system 104 detects a change of the similarity metric amount 310 to "10," meaning the user embeddings system 104 identifies the nine most similar additional users for each base user, such that each base user forms a cluster of ten similar users.

Because the base user segment 320 in FIG. 3A includes eight user embeddings, increasing the number of users by a factor of ten results in eight clusters of ten look-alike users, or a total of 80 users. However, in some cases as described above, the user embeddings system 104 identifies that less than ten similar additional users exist for a base user (e.g. there are less than ten users are within the minimum similarity threshold to the base users). Thus, the total number of additional users adding to a user segment is less than the desired amount of 80 users. In alternative embodiments, for each number of additional users not added to a base user below the similarity metric amount 310, the user embeddings system 104 adds further additional users to another base user (beyond the similarity metric amount 310) so long as the further additional users qualify as similar users to the other base user.

As mentioned above, the user embeddings visualization 304 displays an expanded user segment 322 that includes user embeddings for 53 users. While the intended number of users was 80 users, there were only 53 similar users. Indeed, the dataset of user embeddings may have included thousands of users, but only 53 of the users shared a similarity (e.g., a close enough similarity) to one of the base users.

In one or more embodiments, an additional user may share a similarity to two or more base users. In these embodiments, the user embeddings system 104 may assign the additional user to a first base user having the smaller distance. In some embodiments, the user embeddings system 104 can assign an additional user to the second base user having the larger distance in cases where the first base user has more additional users that qualify as similar users than the second base user.

FIG. 3B also includes the user segment statistics 312 showing the number of users and the number of intended users in the segment as well as the similarity accuracy. More particularly, the number of users in the segment indicates the number of users plotted in the expanded user segment (i.e., 53 users). The number of intended users represents the requested or desired number of users (i.e., 80 users) based on the selected similarity metric amount 310. As described above, while a user selected a similarity metric amount 310 of "10" to increase the number of additional users by a factor of ten, the user embeddings system 104 only identified 53 users to include in the expanded user segment 322 (i.e., 8 base users and 44 additional users).

In some embodiments, the similarity accuracy represents the number of users in the segment divided by the number of intended users. In particular, the similarity accuracy indicates how similar other users in a dataset of users are to the base users in a base user segment. Indeed, the similarity accuracy indicates how saturated the dataset of user embeddings is with respect to base users in the base user segment. Often, as the similarity metric amount 310 is relaxed (e.g., increased to include more additional users in the expanded user segment 322), the similarity accuracy begins to decrease.

As mentioned previously, the graphical user interface 302 provides a user embeddings visualization 304 that is user-manipulatable. For example, a user can provide input to rotate a use in any direction. To illustrate, FIG. 3A and FIG. 3B shows user segment in the same three-dimensional orientation. However, upon the user rotating the user segments about a horizontal axis, the user embeddings system 104 updates the user embeddings visualization 304 to display a new orientation of the expanded user segment 322, as shown on FIG. 3C.

Indeed, to change the orientation of the expanded user segment 322 from FIG. 3B to FIG. 3C, in one or more embodiments, the user provides rotational input 324 that selects the bottom center of the visualization, maintains the input selection while moving up along the vertical center of the visualization, and releases the input selection at the top center of the visualization. Likewise, by providing additional rotational input 326, for example, in a diagonal manner from the center to the top left of the visualization 304, the user can further manipulate the user embeddings visualization 304 to display the expanded user segment 322 shown in FIG. 3D.

Overall, the user embeddings system 104 enables a user (e.g., an administrator) to provide one or more rotational inputs to change the position and orientation of the expanded user segment 322. In addition, the user embeddings system 104 can enable zooming in and out of portions of the expanded user segment 322 within the user embeddings visualization 304. Further, the user embeddings system 104 can provide additional functionality with respect to the user embeddings visualization 304, such as sharing, exporting, enlarging, refreshing, etc. the user embeddings visualization 304.

FIG. 3E illustrates a user modifying the similarity metric 308 to a second metric type. In particular, as shown, the user embeddings system 104 detects user input 328 selecting a change of the similarity metric 308 from "Number of Users" to "Distance." Upon detecting the change to the similarity metric 308, the user embeddings system 104 can update the similarity metric amount 310 within the graphical user interface 302. As shown, the user embeddings system 104 updates the similarity metric amount 310 to indicate at the similarity distance at which additional users are associated with a base user.

As illustrated, in some embodiments, the user embeddings system 104 sets the similarity metric amount 310 to a default amount, such as the lowest available distance. In alternative embodiments, the user embeddings system 104 utilizes the last amount set by the user or another user-defined default amount. As shown, upon setting the similarity metric amount 310 to the lowest value, the user embeddings visualization 304 only includes the base user segment 320. Notably, while the base user segment 320 in FIG. 3E includes the same eight base users, the user embeddings visualization 304 has been rotated from the orientation shown in FIG. 3A (as indicated by the different orientations of the XYZ Cartesian Coordinates shown at the left of the user embeddings visualization 304).

Upon the user changing the similarity metric amount 310, the user embeddings system 104 can respond by identifying a corresponding number of additional users to include in an expanded user segment. To illustrate, FIG. 3F shows the result of a user changing the similarity metric amount 310 to 0.20. In response, the user embeddings system 104 determines an expanded user segment 322 that satisfies the similarity metric amount 310 set by the user (i.e. 0.20). Indeed, the user embeddings system 104 determines additional user embeddings from the group of users that have similarity distances of less than 0.20 to the base users.

As mentioned above, when the similarity metric amount 310 is relaxed, the user embeddings system 104 identifies further additional users. As illustrated, based on the similarity metric amount 310 of 0.20, the user embeddings visualization 304 found 498 similar users. Indeed, while the user embeddings system 104 selects 799 users based on the user-specified similarity metric amount 310, the user embeddings system 104 only found 498 users to be similar to the base users.

As shown in FIG. 3F, some base users form large clusters of additional users while other base users have relatively few additional users upon expanding the base user segment 320. Indeed, larger clusters indicate a larger grouping of similar user to the corresponding base user and the other users in the cluster. Further, some clusters have a tighter grouping indicating a closer similarity among users while other clusters with a spread grouping indicate that the users are less similar to each other.

Figure 4A:
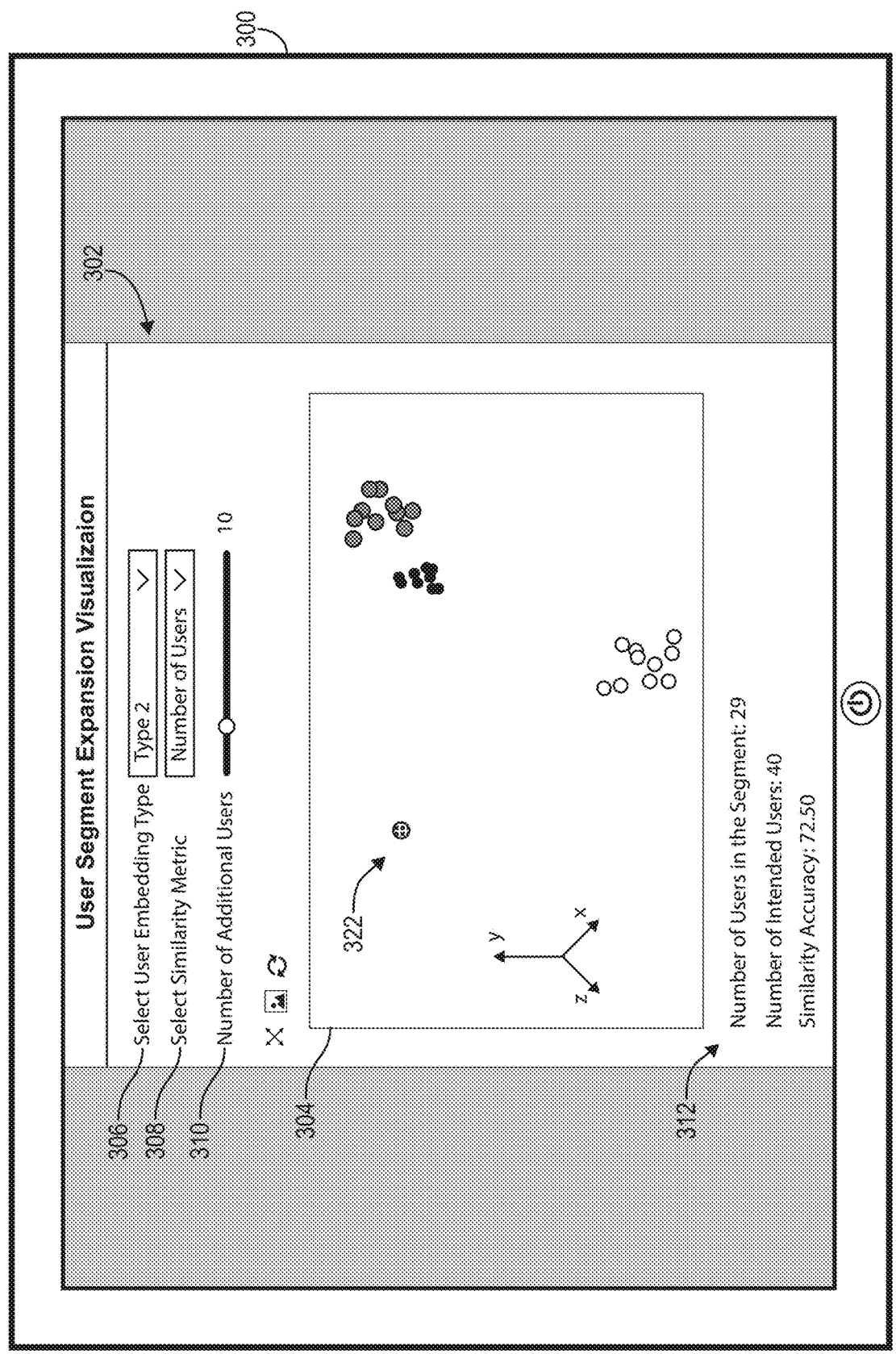
FIGS. 4A-4C illustrate diagrams of a graphical user interface for pruning a user segment in accordance with one or more embodiments.
Figure 4B:
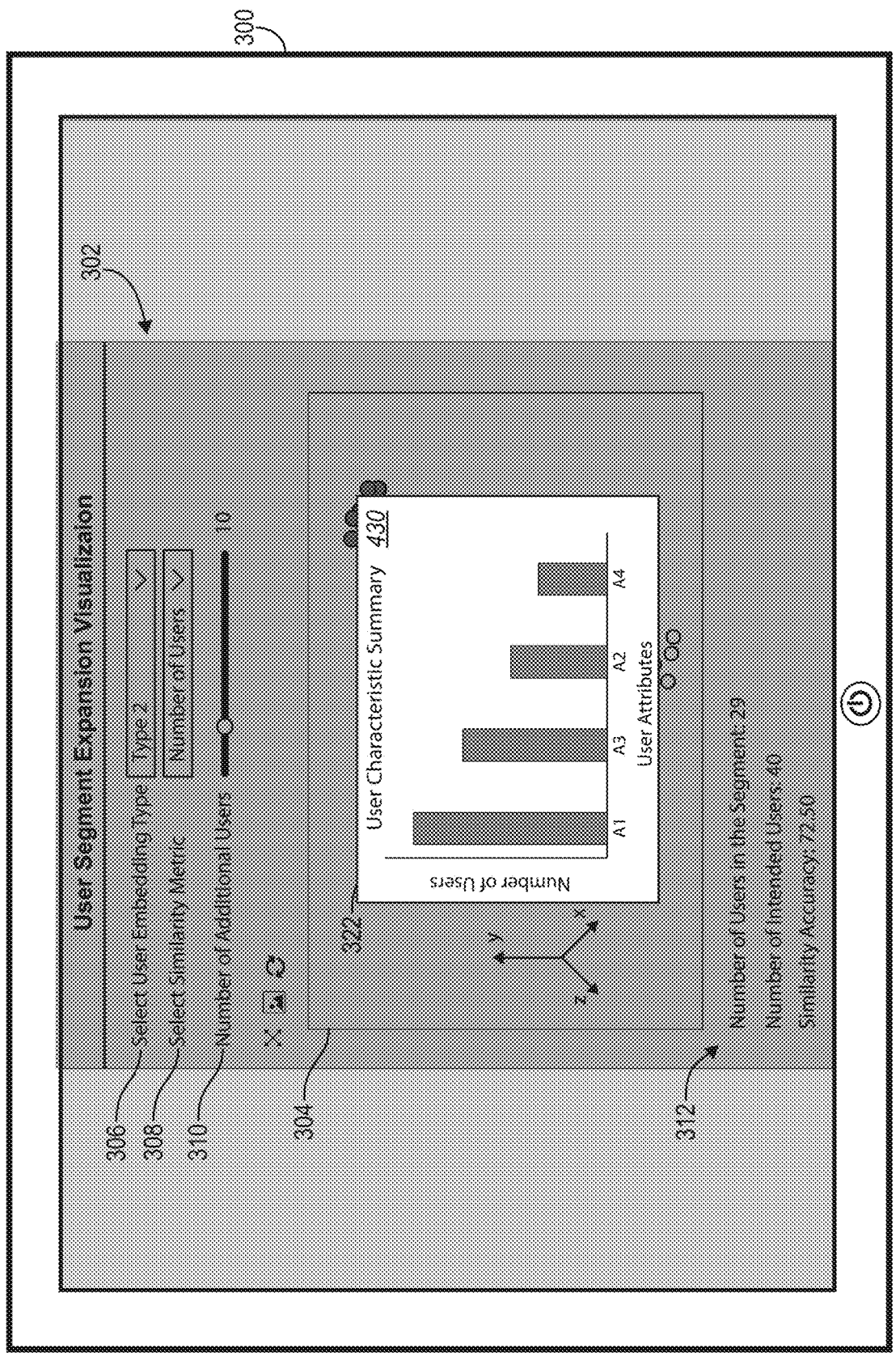
Figure 4C:
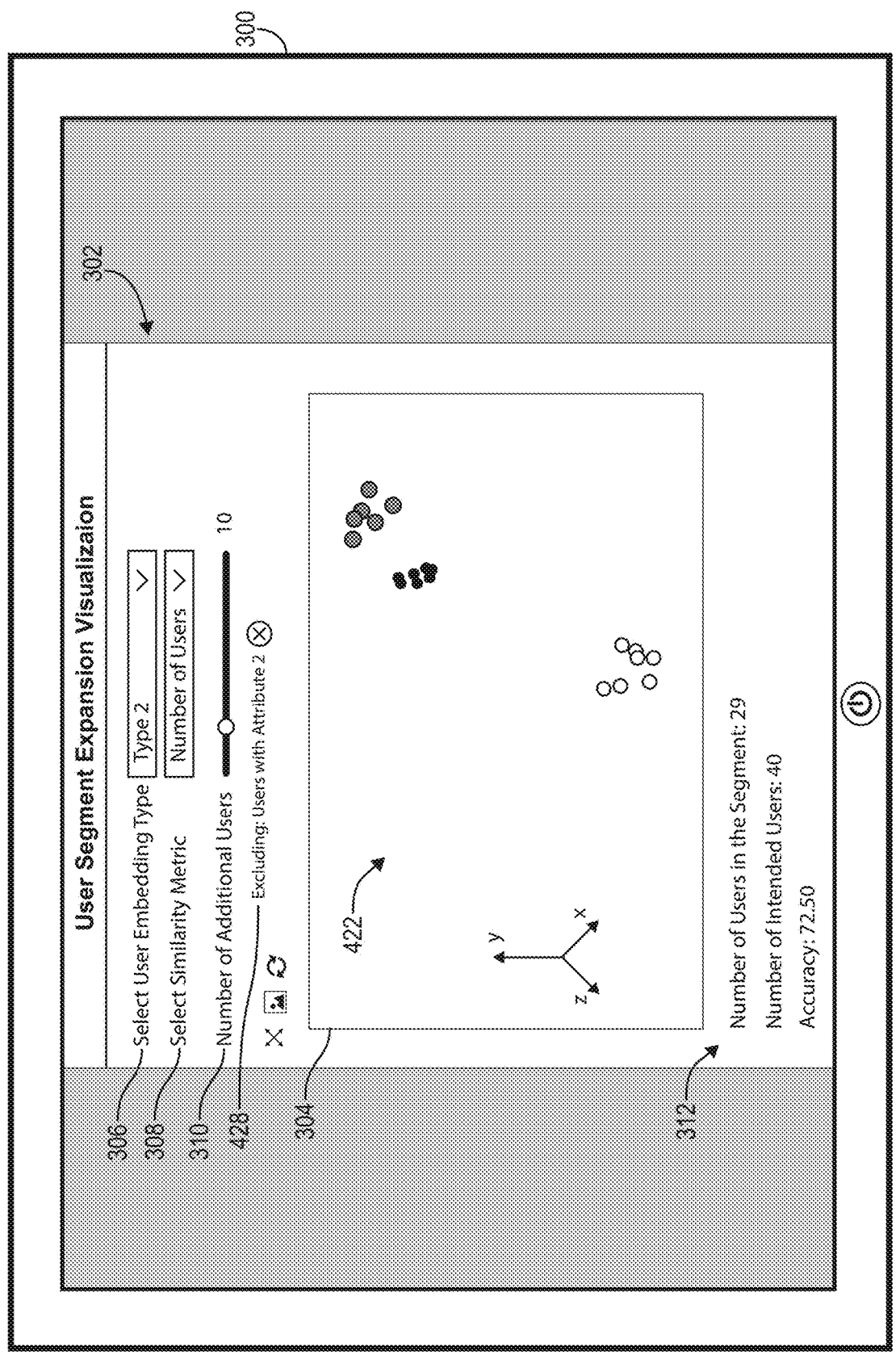

Turning now to FIGS. 4A-4C, additional description is provided regarding pruning a user segment. In particular, FIGS. 4A-4C illustrate diagrams of a graphical user interface pruning an expanded user segment. For ease of explanation, FIGS. 4A-4C include the same client device 300 and elements 302-312 described above with respect to FIGS. 3A-3F. For example, FIG. 4A illustrates an expanded user segment 322 within a user embeddings visualization 304 that the user embeddings system 104 generates based on selections of expansion parameters. Notably, while FIG. 4A shows a different selection of the user embeddings type 306 (i.e., "Type 2"), the same principles and concepts described above apply.

In some embodiments, as part of being user-manipulatable, the user embeddings visualization 304 enables the user to select individual users and/or clusters of users. In response to the selection, the user embeddings system 104 updates the graphical user interface 302 to show additional information about the selected user or cluster(s) of users. For example, the user embeddings system 104 indicates user attributes associated with the user or cluster of users.

In some embodiments, the user embeddings system 104 generates an additional visualization that provides information about the expanded user segment 322 as a whole. To illustrate, FIG. 4B includes a user characteristic summary visualization 430 that indicates the user attributes found among the expanded user segment 322. In particular, the user characteristic summary visualization 430 shows a graph indicating the number of users in the expanded user segment 322 that possess one of the identified user attributes. In alternative embodiments, the user characteristic summary visualization 430 provides graphs, summaries, or other breakdowns of characteristics and/or attributes of the users in the expanded user segment 322.

As mentioned above, the user embeddings system 104 can enable a user to prune one or more users from the expanded user segment 322. As a note, while the following description describes removing users from an expanded user segment 322, the same principles can be applied to removing users from a base user segment. In one or more embodiments, the user embeddings system 104 allows a user (e.g., an administrator) to remove a user from the expanded user segment 322 by selecting the user and providing instructions to remove the user. For example, upon noticing an outlier in the expanded user segment 322 within the user embeddings visualization 304, the user selects the outlier user and, in response, the user embeddings system 104 removes the user.

In some embodiments, the user embeddings system 104 enables the user (e.g., an administrator) to remove one or more plotted users from the expanded user segment 322 based on the users having an undesirable trait or characteristic. For example, if the user is a marketer and desires to offer a service for women to users in the expanded user segment 322 (and all the base users are women), then removing men from the expanded user segment 322 would increase the accuracy of a desired user segment, even if the men in the expanded user segment 322 have many similar traits and attributes to the women in the expanded user segment 322. Indeed, as described below, the user embeddings system 104 enables the administrator to remove users sneaking into the expanded user segment 322 because of their similarity, who are not indented to be included in the user segment because of unwanted traits and attributes.

As mentioned above, the user characteristic summary visualization 430 in FIG. 4B shows a graph indicating user attributes found in users of the expanded user segment 322. In various embodiments, the user embeddings system 104 enables the user (e.g., administrator) to select one of the attributes to exclude from the expanded user segment 322. For example, if the user selects Attribute 2 (shown as "A2") to exclude from the expanded user segment 322, the user embeddings system 104 can remove each user in the expanded user segment 322 having the selected attribute.

More particularly, upon receiving a selection of an unwanted attribute, the user embeddings system 104 identifies each of the users in the expanded user segment 322 that have the unwanted attribute. For example, the user embeddings system 104 accesses the user profile data and/or the structured user data to determine user identifiers of users in the expanded user segment 322 that have an attribute identifier of the unwanted attribute. Then, the user embeddings system 104 updates a listing or table that includes users in the expanded user segment 322 to exclude the identified users. In some cases, the table that includes users in the expanded user segment 322 also indicates the attributes associated with each of the listed users, which the user embeddings system 104 can utilize to identify and remove users having the unwanted attribute (e.g., unwanted users).

Upon pruning the unwanted users from the expanded user segment 322, in one or more embodiments, the user embeddings system 104 updates the display of the user embeddings visualization 304 within the graphical user interface 302. To illustrate, FIG. 4C shows a pruned expanded user segment 422 having fewer users than the expanded user segment 322 displayed in FIG. 4A. As shown, the pruned expanded user segment 422 includes 19 users (i.e., ten fewer users). In some embodiments, pruning the expanded user segment 322 increases the accuracy, as shown in the user segment statistics 312 in FIG. 4C. However, in some cases, pruning users from an expanded user segment may not affect or negatively affect the accuracy, but generally always moves the pruned expanded user segment in a direction or focus desired by the administrator.

In addition, the graphical user interface 302 in FIG. 4C includes an indication 428 that the user embeddings system 104 has removed users having Attribute 2 (along with an option to cancel/undo the pruning). When multiple attributes are pruned, the graphical user interface 302 can include multiple indications. Further, in various embodiments, the graphical user interface 302 includes indications when individual users or clusters of users are manually removed from a user segment.

In addition to pruning users from an expanded user segment 422, the user embeddings system 104 can enable a user (e.g., administrator) to emphasize and/or add users having selected attributes to a user segment. For instance, in some embodiments, upon selecting a user attribute, the user embeddings system 104 emphasizes users having those attributes in the expanded user segment 422. For example, the user embeddings system 104 enlarges, bolds, colors, or otherwise modifies uses in the user embeddings system 104 having the selected attribute. In this manner, the user can visualize if particular clusters of users within the expanded user segment 422 also share a common attribute and/or if specific attributes are unique to particular clusters.

In addition, the user embeddings system 104 can identify further users to add to an expanded user segment 422 based on a selected user attribute. For example, the user embeddings system 104 determines an intersection of users that have both the selected attribute and that are within the minimum similarity distance to a base user. In this manner, the user embeddings system 104 facilitates the customization of the expanded user segment 422 as desired by a user.

Figure 5A:
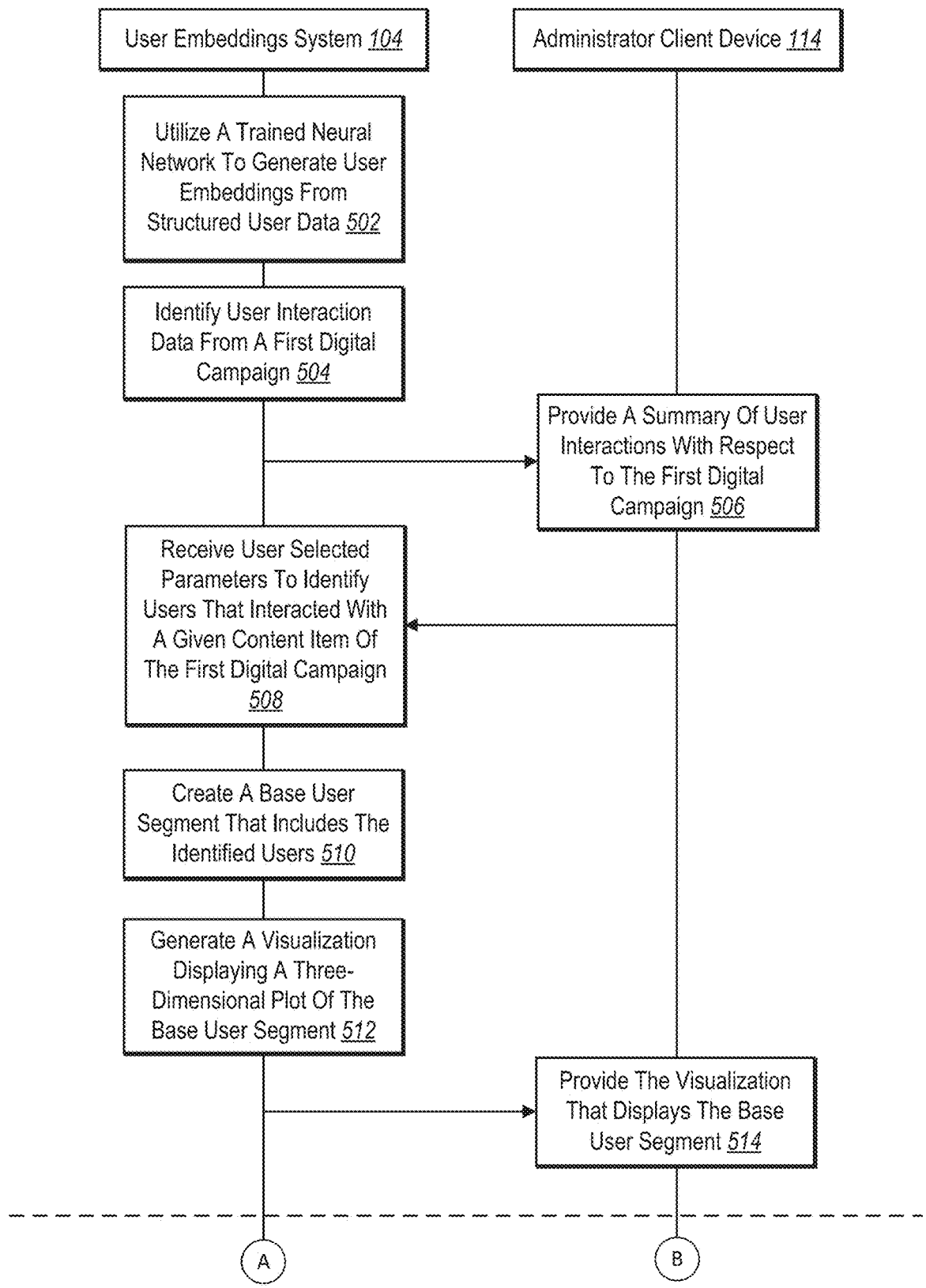
FIGS. 5A-5B illustrate a diagram of providing content to an expanded user segment in accordance with one or more embodiments.
Figure 5B:
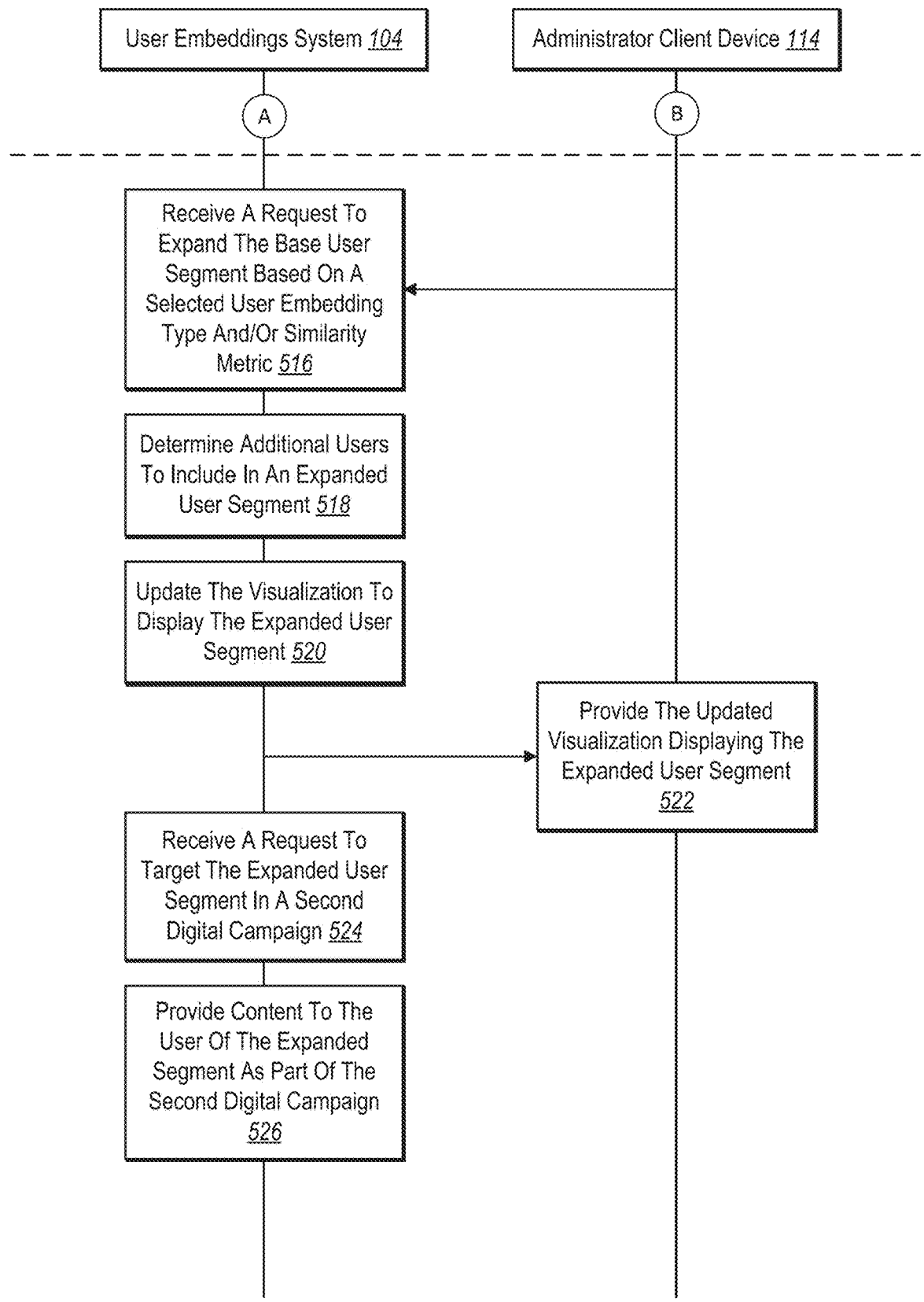

Turning now to FIGS. 5A-5B, additional detail regarding an example of utilizing an expanded user segment is now provided. In particular, FIGS. 5A-5B illustrate a diagram of providing content to an expanded user segment. As shown, FIGS. 5A-5B include the user embeddings system 104 and the administrator client device 114, which are described above.

As shown, the user embeddings system 104 utilizes 502 a trained neural network to generate user embeddings from structured user data. As mentioned above and as described further below, the user embeddings system 104 can train a neural network to generate uniform user embeddings that include latent features that encode user characteristics, attributes, traits, and other information about users. Upon generating the user embeddings, the user embeddings system 104 can store the user embeddings in a table or database that links user identifiers to their corresponding user embeddings.

In addition, the user embeddings system 104 identifies 504 user interaction data from a first digital campaign. In some instances, the user interaction data indicates interactions between users and various content items associated with a particular brand being promoted in the first digital campaign. In addition, in some embodiments, the user interaction data corresponds to the same users for which the user embeddings system 104 generated the user embeddings. In various embodiments, the user embeddings system 104 utilizes the user interaction data to form structured user data (e.g., user traits sequences) and obtain the generated user embeddings.

As shown in FIG. 5A, the user embeddings system 104 provides 506 the administrator client device 114 with a summary of the user interactions with respect to the first digital campaign. For example, the user interaction summary indicates the type, number, and frequency of interactions with each content item being emphasized in the first digital campaign. In some cases, the summary includes visual graphs and charts of the user interaction data presented in a graphical user interface generated by the user embeddings system 104 (e.g., directly or indirectly).

In response and as shown, the user embeddings system 104 receives 508 user-selected parameters to identify users that interacted with a given content item of the first digital campaign. For example, the first digital campaign included sending an email with a discount to a group of user and the selection indicates that users that redeemed the discount are to be included in a base user segment. Indeed, the administrator using the administrator client device 114 selects one or more interactions of interest, and provides the selection to the user embeddings system 104. Then, the user embeddings system 104 identifies which users from the user interaction data satisfy the received selection. In alternative embodiments, the user embeddings system 104 receives a list of selected users that interacted with a given content item of the first digital campaign selected at the administrator client device 114.

Upon identifying a group of users based on the user-selected parameters, the user embeddings system 104 creates 510 a base user segment that includes the identified users. Indeed, the base user segment is made up of users that have a realized trait, performed a particular interaction, or have a desired behavioral characteristic with respect to a content item from the first digital campaign.

As part of creating the base user segment, the user embeddings system 104 optionally generates 512 a visualization displaying a three-dimensional plot of the base user segment, as described above. For example, the user embeddings system 104 plots three-dimensional versions of the user embeddings corresponding to the base users in a user embeddings visualization. Further, as shown in FIG. 5A, the user embeddings system 104 provides 514 the visualization that displays the base user segment to the administrator client device 114.

As described above in connection with FIGS. 3A-3F, the administrator can select expansion parameters to increase the number of users in the base user segment with similar look-alike users. Indeed, as shown in FIG. 5B, the user embeddings system 104 receives 516 a request to expand the base user segment based on a selected user embeddings type 306 and/or similarity metric. In some embodiments, the request may include multiple user inputs specifying different expansion parameters, as described above.

Based on the expansion parameters provided by the administrator client device 114, the user embeddings system 104 automatically determines 518 additional users to include in an expanded user segment. In particular, the user embeddings system 104 identifies additional user embeddings of users in the group (e.g., associated with the first digital campaign) that are within a minimum threshold similarity threshold of the base users and that satisfy the received expansion parameters. Identifying additional users to include in an expanded user segment is explained previously in connection with FIGS. 3A-3F.

In addition, upon identifying the additional users, the user embeddings system 104 updates 520 the visualization to display the expanded user segment. Further, the user embeddings system 104 provides 522 the updated visualization displaying the expanded user segment to the administrator client device 114 (e.g., within a graphical user interface), as shown in FIG. 5B. In one or more embodiments, the administrator client device 114 further modifies the expansion parameters and the user embeddings system 104 identifies more or fewer additional users for the expanded user segment (i.e., repeats actions 516-522).

As mentioned above, the expanded user segment includes similar users to the base users, who have desirable interactions within the first digital content campaign. Therefore, there is a high likelihood (e.g., high accuracy) that the expanded user segment of holistically similar users will share those same desirable interactions with similar digital content campaigns. Accordingly, FIG. 5B shows the user embeddings system 104 receiving 524 a request to target users in the expanded user segment in a second digital content campaign.

Further, as shown, the user embeddings system 104 provides 526 content to the users of the expanded user segment as part of the second digital content campaign. For example, the user embeddings system 104 provides similar promotional offers to the users in the expanded user segment. In various embodiments, the request to target the users in the expanded user segment and/or providing content excludes the base users. Indeed, the user embeddings system 104 provides a promotional offer to the users in the expanded user segment minus the base users that have previously redeemed a corresponding promotion.

One will appreciate that FIGS. 5A-5B illustrate one example use of an expanded user segment. In alternative embodiments, the user embedding system or a third party system can use the expanded user segment to target users for advertising or other content deliver or for data analytics.

Turning now to the next set of figures, FIGS. 6A-6B and FIGS. 7A-7B provide examples of neural networks that the user embeddings system 104 trains and utilizes to generate user embeddings. For example, FIGS. 6A-6B includes an interaction-to-vector neural network and FIGS. 7A-7B include an LSTM autoencoder model having an LSTM encoder neural network and an LSTM decoder neural network. Each of these neural networks is described in turn.

Figure 6A:
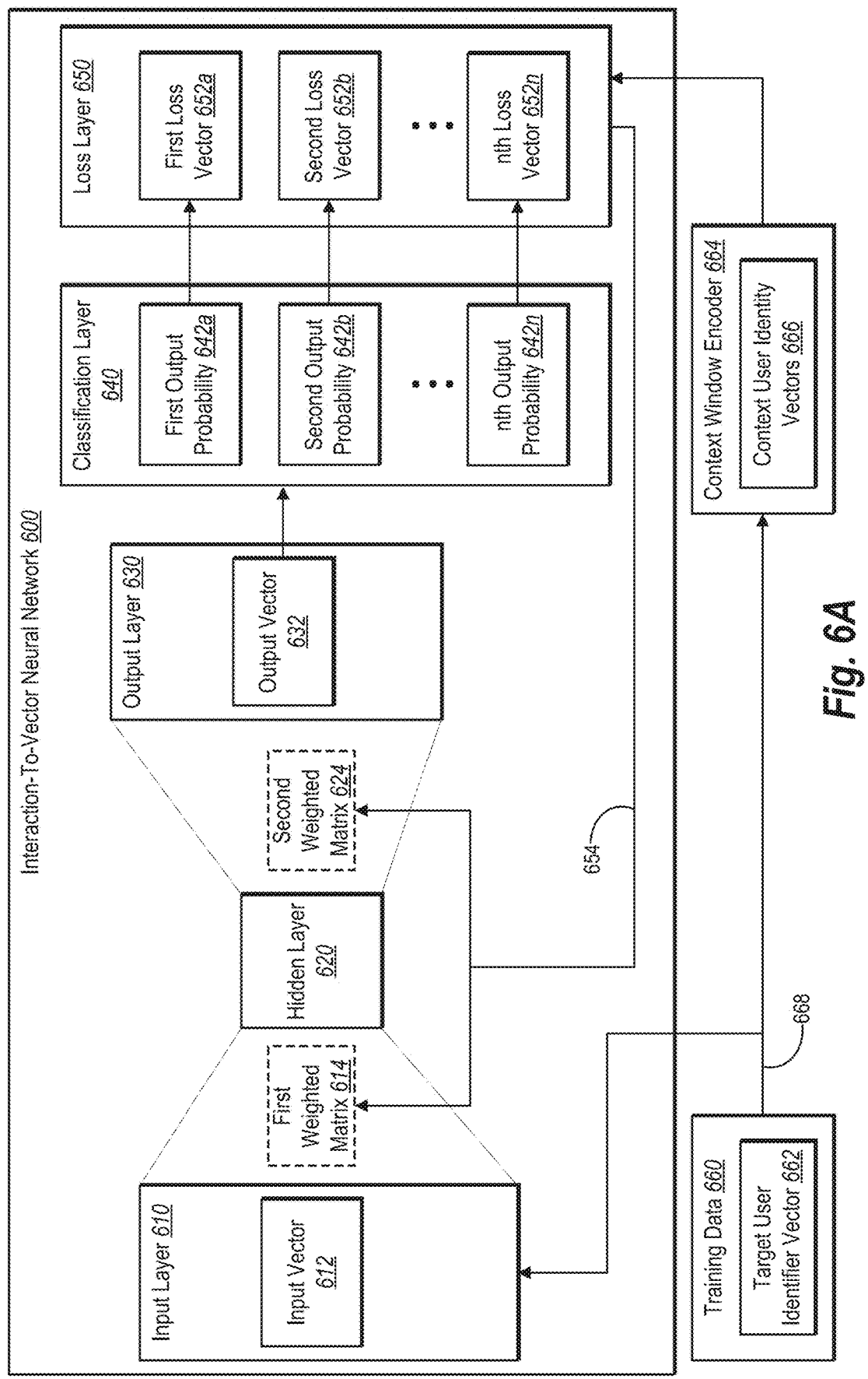
FIGS. 6A-6B illustrate a diagram of training and utilizing an interaction-to-vector neural network to generate uniform user embeddings in accordance with one or more embodiments.
Figure 6B:
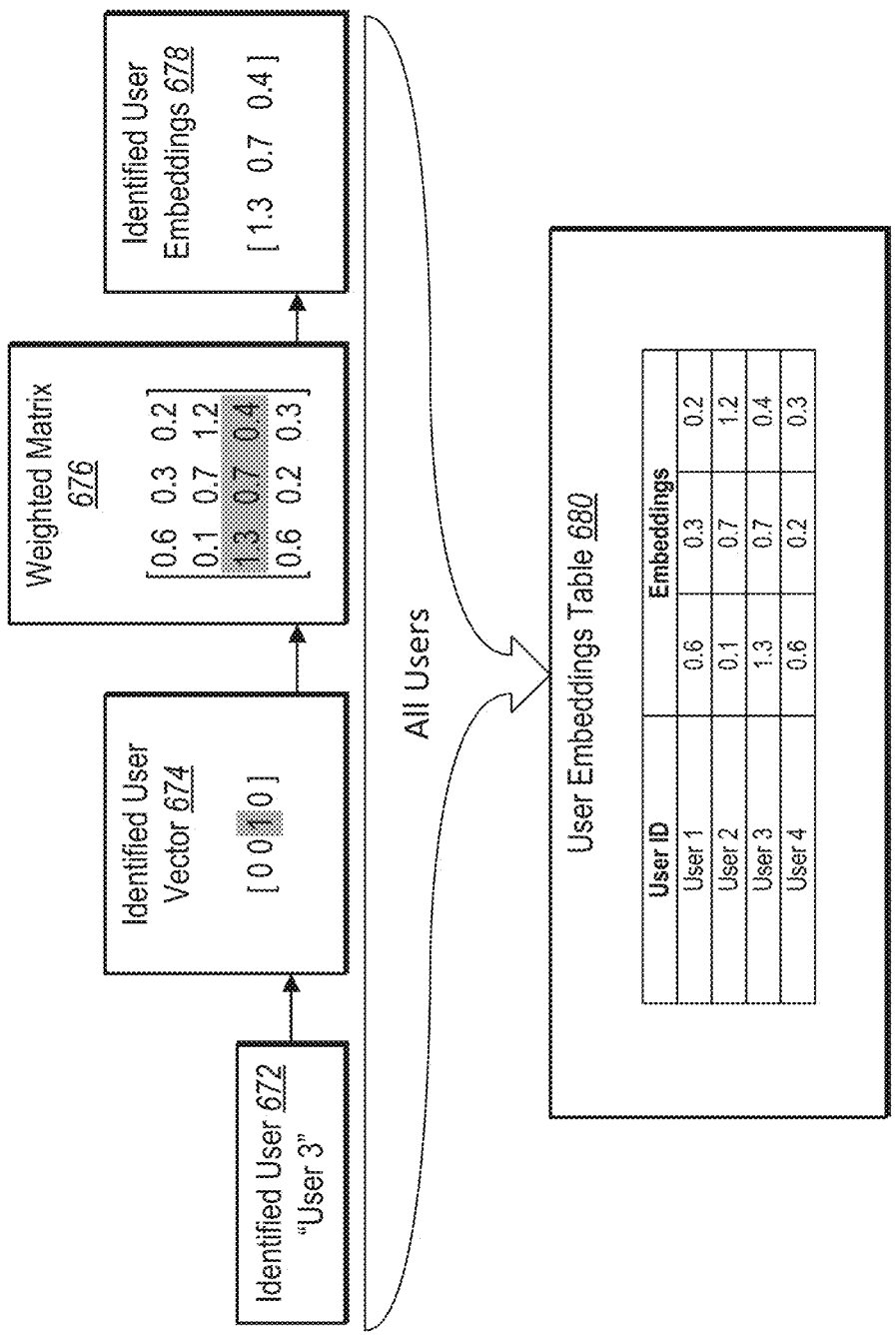

Regarding FIGS. 6A-6B, FIG. 6A illustrates the architecture of an interaction-to-vector neural network 600 as well as a high-level overview of training the interaction-to-vector neural network 600 to generate user embeddings. FIG. 6B illustrates utilizing the interaction-to-vector neural network 600 to generate user embeddings. Creating, training, and utilizing the interaction-to-vector neural network 600 is described in detail in U.S. patent application Ser. No. 16/149,347, titled "GENERATING HOMOGENOUS USER EMBEDDING REPRESENTATIONS FROM HETEROGENEOUS USER INTERACTION DATA USING A NEURAL NETWORK," and filed Oct. 2, 2018, the entire contents of which is hereby incorporated by reference.

As shown, FIG. 6A includes the interaction-to-vector neural network 600. In one or more embodiments, the architecture of the interaction-to-vector neural network 600 is similar to a word2vector neural network, which is a group of related models that produce word embeddings give sets of words within documents. Commonly, word2vector neural networks are two-layer neural networks that produce a vector space that is hundreds of dimensions. Example of word2vector neural networks include a continuous bag-of-words and a skip-gram neural network. In various embodiments, the interaction-to-vector neural network 600 follows an architecture similar to a skip-gram neural network. However, in other embodiments, the interaction-to-vector neural network 600 follows a bag-of-words or other type of neural network architecture that vectorizes inputs and creates input embeddings.

As illustrated, FIG. 6A includes an interaction-to-vector neural network 600 that includes multiple neural network layers (or "layers"). Each illustrated layer can represent one or more types of neural network layers and/or include an embedded neural network. For example, the interaction-to-vector neural network 600 includes an input layer 610, at least one hidden layer 620, an output layer 630, and a classification layer 640. In addition, during training, the interaction-to-vector neural network 600 includes a loss layer 650. As described below, each layer transforms input data into a more usable form for the next layer (e.g., by changing the dimensionality of the input), which enables the interaction-to-vector neural network 600 to analyze features at different levels of abstraction and learn to determine weights and parameters for user embeddings.

In addition, the interaction-to-vector neural network 600 includes a first weighted matrix 614 and a second weighted matrix 624. As shown, the first weighted matrix 614 transforms data from the input vector 612 to the hidden layer 620. Similarly, the second weighted matrix 624 transforms data from the hidden layer 620 to the output layer 630. FIG. 6A illustrates a single first weighted matrix 614 and a single second weighted matrix 624. Further, the input layer 610 is provided an input vector 612. In one or more embodiments, the input vector is a one-hot encoded vector that is sized to include the number of users (e.g., V) found in the user profile data (e.g., user interaction data).

The user embeddings system 104 can apply the first weighted matrix 614 to the input vector 612. In one or more embodiments, the first weighted matrix 614 is a hidden matrix that includes weights that correlate each user to each of the features in the hidden layer 620. For example, the size of the first weighted matrix 614 is the number of user identifiers by the number of features (e.g., the embedding size) in the hidden layer 620. Thus, if the number of user identifiers is represented by V and the number of hidden features is represented by N, the size of the first weighted matrix 614 is V×N. Further, in some embodiments, the hidden layer is sized based on the number of features corresponding to the user embeddings. More particularly, the number of features determines the embedding size of each user embedding.

As previously mentioned, the second weighted matrix 624 is located between the hidden layer 620 and the output layer 630. Indeed, the second weighted matrix 624 transforms data in the interaction-to-vector neural network 600 from the hidden layer 620 to an output vector in the output layer 630. Accordingly, the size of the second weighted matrix 624 is the number of hidden features (e.g., N) by the number of user identifiers (e.g., V), or N×V.

As shown, the output layer 630 includes an output vector 632. In one or more embodiments, the output vector 632 corresponds to each of the user identifiers. Accordingly, the size of the output vector 632 is similar to the size of the input vector 612, or V×1. In addition, the output vector 632 can include floating point numbers resulting from one or more of second weighted matrices being applied to the hidden layer 620 for a given user identifier (e.g., indicated in the input vector 612). These numbers can be above or below zero.

As shown in FIG. 6A, the interaction-to-vector neural network 600 also includes the classification layer 640 having output probabilities 642a-442n corresponding to each user identifier. In general, the classification layer 640 generates a probability that each user identifier is similar to a given input user identifier. In various embodiments, the classification layer 640 utilizes a softmax regression classifier to determine this probability.

To illustrate, Equation 1 below provides an example for calculating an output vector for the interaction-to-vector neural network 600.

$$V_O = V_C \times W1 \times W2 \quad (1)$$

In Equation 1, $V_O$ represents an output vector and $V_C$ represents a given input vector for a given user identifier that appears as a one-hot encoded vector (e.g., the input vector 612). Further, W1 represents the first weighted matrix 614 and W2 represents the second weighted matrix 624. Notably, the user embeddings system 104 can calculate separate output vectors 632 for each user identifier input into the interaction-to-vector neural network 600.

In many embodiments, the user embeddings system 104 (e.g., via the softmax regression classifier) normalizes the probabilities such that the probability that a given target user identifier is similar to a given input user identifier is between zero and one (i.e., 0-1). Further, as part of normalizing, the user embeddings system 104 ensures that the output probabilities 642a-442n sum to one (i.e., 1).

As shown in FIG. 6A, the interaction-to-vector neural network 600 includes the loss layer 650 including the loss vectors 652a-452n for each of the output probabilities 642a-442n. In addition, the loss layer 650 provides an error loss feedback vector 654 to train and tune the weighted matrices of the interaction-to-vector neural network 600. In one or more embodiments, the loss layer 650 can provide the error loss feedback vector 654 in a combined error vector, which sums the error loss of each of the loss vectors 652a-452n for each training interaction corresponding to a given input vector 612.

Further, in some embodiments, the loss layer 650 utilizes a loss model to determine an amount of loss (i.e., training loss), which is used to train the interaction-to-vector neural network 600. For example, the loss layer 650 determines training loss by comparing the output probabilities 642a-442n to a ground truth (e.g., training data) to determine the error loss between each of the output probabilities 642a-442n and the ground truth, which is shown as the loss vectors 652a-452n. In particular, the user embeddings system 104 determines the cross-entropy loss between the output probabilities 642a-442n and the training data.

In addition, using the error loss feedback vector 654, the user embeddings system 104 can train the interaction-to-vector neural network 600 via back propagation until the overall loss is minimized. Indeed, the user embeddings system 104 can conclude training when the interaction-to-vector neural network 600 converges and/or the total training loss amount is minimized. For example, the user embeddings system 104 utilizes the error loss feedback vector 654 to tune the weights and parameters of the first weighted matrix 614 and the second weighted matrix 624 to iteratively minimize loss. In additional embodiments, the user embeddings system 104 utilizes the error loss feedback vector 654 to tune parameters of the hidden layer 620 (e.g., add, remove, or modify neurons) to further minimize error loss.

Regarding training the interaction-to-vector neural network 600, FIG. 6A also includes training data 660 having a target user identifier vector 662. Also, FIG. 6C includes a context window encoder 664. The target user identifier vector 662 can represent user identifiers extracted from the structured user data. For example, the target user identifier vector 662 represents structured user data and includes a vector of user identifiers where each user identifier is adjacent to other user identifiers that share similar contexts with the user regarding interacting with content items. Indeed, the adjacent user identifiers correspond to other users that interacted with the same content items using the same type of user interaction around the same time as the user.

In various embodiments, to train the interaction-to-vector neural network 600, the user embeddings system 104 selects a user identifier from the target user identifier vector 662 and provides the selected user identifier 668 to the input layer 610. In response, the input layer 610 generates an encoded input vector 612 (e.g., using one-hot encoding) that corresponds to the provider user identifier. The user embeddings system 104 then feeds the input vector 612 through the interaction-to-vector neural network 600 as described above. In addition, the user embeddings system 104 provides the target user identifier vector 662 to the context window encoder 664 with an indication of the selected user identifier 668 in the target user identifier vector 662.

In some embodiments, the context window encoder 664 generates and provides context user identifier vectors 666 to the loss layer 650. Largely, context user identifiers are defined by a window (i.e., a context window) of predefined length (e.g., 3 entries, 5 entries, 15 entries) that includes the selected user identifier from the target user identifier vector 662 as well as user identifiers located before and/or after the selected user identifier. For example, if the context widow has a size of five (i.e., five entries), the context window encoder 664 identifies two entries before and two entries after the selected user identifier in the target user identifier vector 662. If the selected user identifier does not have two entries before or after, the context window encoder 664 can reduce the content window size or shift the context window over.

In various embodiments, the user embeddings system 104 provides the context user identifier vectors 666 to the loss layers 650. In response, the loss layer 650 compares the output probabilities received from the classification layer 640 to the context user identifier vectors 666 to calculate the error loss for each output probability. The user embeddings system 104 can total the error loss and back propagate the total error loss to layers and matrices of the interaction-to-vector neural network 600 in the form or error loss feedback vector 654.

Using the ground truth from the context user identifier vectors 666 and the output probabilities of the interaction-to-vector neural network 600 corresponding to the selected user identifier 668 encoded as the input vector 612, the loss layer 650 can determine loss vectors corresponding to at least each of the context user identifier vectors 666. Further, the loss layer 650 can combine the loss vectors to determine the error loss feedback vector 654 used to train the interaction-to-vector neural network 600.

Once the error loss feedback vector 654 is backpropagated to the interaction-to-vector neural network 600, the user embeddings system 104 increments or slides the position of the context window along the target user identifier vector 662 and repeats the above actions for the next selected user identifier and context user identifiers. Each time the user embeddings system 104 slides the context window, the user embeddings system 104 calculates and provides the error loss feedback vector 654 back to the interaction-to-vector neural network 600 as part of the training. The user embeddings system 104 can slide the context window along the target user identifier vector 662 until the end of the vector is reached.

As described above, the user embeddings system 104 trains the layers and/or matrices of the interaction-to-vector neural network 600 using the error loss feedback vector 654 until the overall error loss is minimized. For example, in one or more embodiments, the user embeddings system 104 tunes the weights of the first weighted matrix 614 and the second weighted matrix 624 until the overall error loss is minimized at the loss layer 650. In some embodiments, the user embeddings system 104 decreases the learning rate as training progresses.

Once the user embeddings system 104 trains the interaction-to-vector neural network 600, the user embeddings system 104 can identify user embeddings for each of the users. In one or more embodiments, the user embeddings system 104 utilizes the first weighted matrix 614 as the user embeddings. In alternative embodiments, the user embeddings system 104 utilizes the second weighted matrix 624 as the user embeddings.

To illustrate, FIG. 6B shows the user embeddings system 104 utilizing a weighted matrix to identify the learned user embeddings. More particularly, FIG. 6B illustrates an example embodiment of the user embeddings system 104 identifying user embeddings from a weighted matrix (e.g., the first weighted matrix) and storing the user embeddings. As shown, FIG. 6B includes an identified user 672, an identified user vector 674, a weighted matrix 676, and an identified user embeddings 678. FIG. 6B also shows a User Embeddings Table 680 identified for all of the users.

In one or more embodiments, the user embeddings system 104 selects or identifies a user from the user interaction data (e.g., the identified user 672). As shown in FIG. 6B, the user embeddings system 104 selects User 3 as the identified user 672. Upon selecting the identified user 672, the user embeddings system 104 generates an identified user vector 674 corresponding to the user. For example, as shown, the user embeddings system 104 generates a one-hot encoded vector that indicates User 3 as the identified user 672. In various embodiments, the user embeddings system 104 generates the identified user vector 674 to properly identify the correct features in the weighted matrix 676, as described next.

As shown in FIG. 6B, the user embeddings system 104 identifies a weighted matrix 676 that includes learned weights that properly encode the context of a user. In some embodiments, the weighted matrix 676 is the trained first weighted matrix described in FIG. 6A. In alternative embodiments, the weighted matrix 676 is the trained second weighted matrix or a combination of the first weighted matrix and the second weighted matrix described previously.

To identify the weights corresponding to the identified user 672, in various embodiments, the user embeddings system 104 multiplies the identified user vector 674 with the weighted matrix 676. Indeed, by multiplying the identified user vector 674 with the weighted matrix 676, the user embeddings system 104 obtains the identified user embeddings 678 (e.g., vectorized user embeddings) shown in FIG. 6B. In addition, the user embeddings system 104 can store the identified user embeddings 678 in the user embeddings table 680. Further, the user embeddings system 104 can repeat the above actions for each of the users to populate the user embeddings table 680 with each user's embeddings.

Upon obtaining the learned user embeddings for each user, the user embeddings system 104 can perform additional actions to identify users that share similar contexts with each other with respect to content items and/or user interactions. In particular, the user embeddings system 104 can utilize the user embeddings to generate expanded user segment, as described herein.

FIGS. 6A-6B described various embodiments of training an interaction-to-vector neural network 600 and generating user embeddings (e.g., user interaction embeddings) for users. Accordingly, the actions and algorithms described in connection with FIGS. 6A-6B provide example structure for generating a plurality of user embeddings for a plurality of users based on structured user data that transforms user profile data into uniform user embedding vectors. More particularly, the actions and algorithms described in training the interaction-to-vector neural network 600 with respect to FIG. 6A as well as using the trained interaction-to-vector neural network 600 to obtain user embeddings with respect to FIG. 6B can provide structure for performing a step for generating the user embeddings for the plurality of users based on the organized user interaction data to obtain homogenous embedding representations from heterogeneous user interaction data.

Similarly, FIGS. 6A-6B, the above description, and U.S. patent application Ser. No. 16/149,347 (referenced above), provide example structure for converting user profile data for the plurality of users into structured user data that encodes user attributes into the structured user data. Indeed, FIGS. 6A-6B, corresponding description, and the subject matter incorporated above provide actions and algorithms to performing a step for converting the user profile data into organized user interaction data based on content items, interaction types, and interaction timestamps.

Figure 7A:
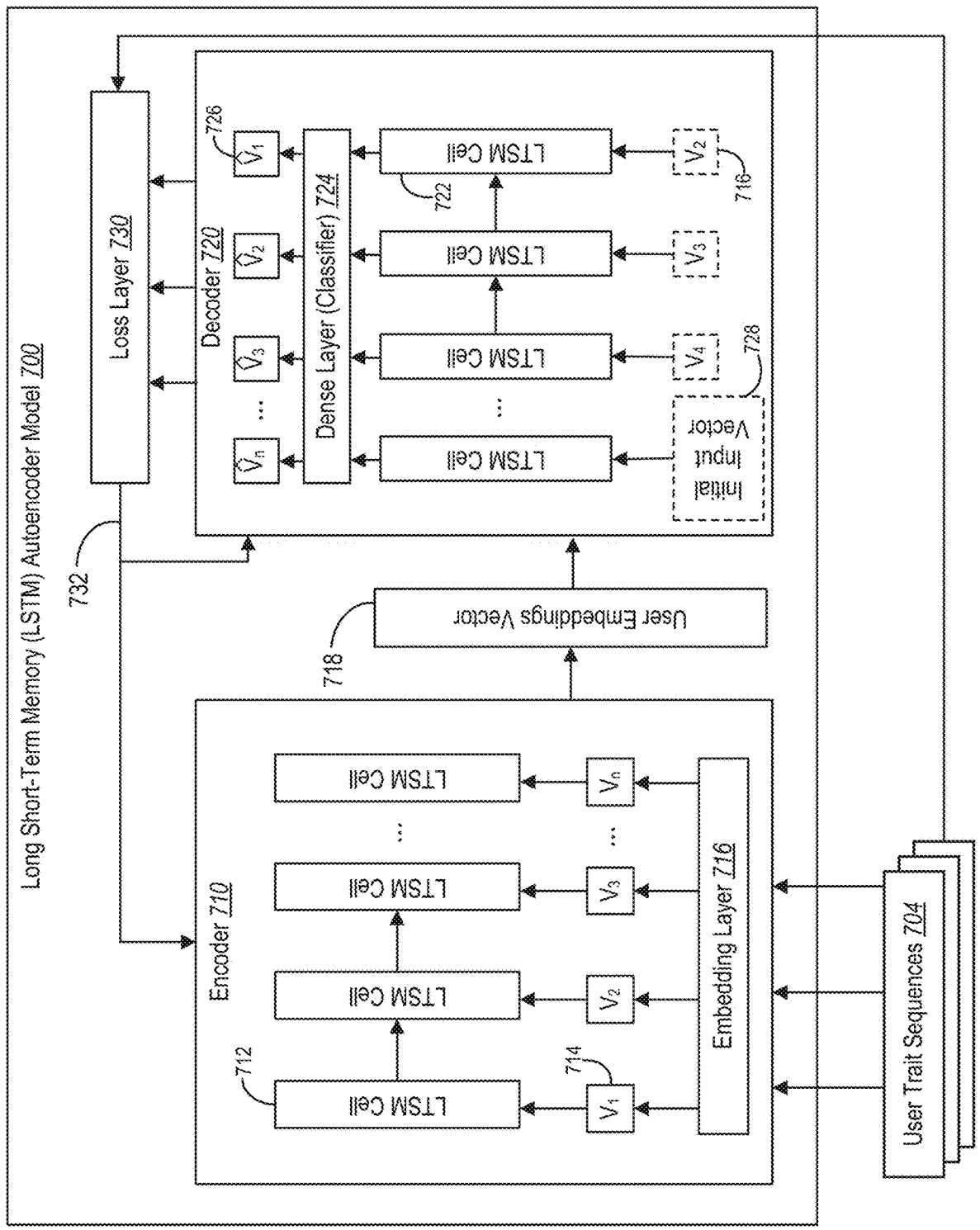
FIGS. 7A-7B illustrate a diagram of training and utilizing a long short-term memory (LSTM) autoencoder network to generate uniform user embeddings in accordance with one or more embodiments.
Figure 7B:
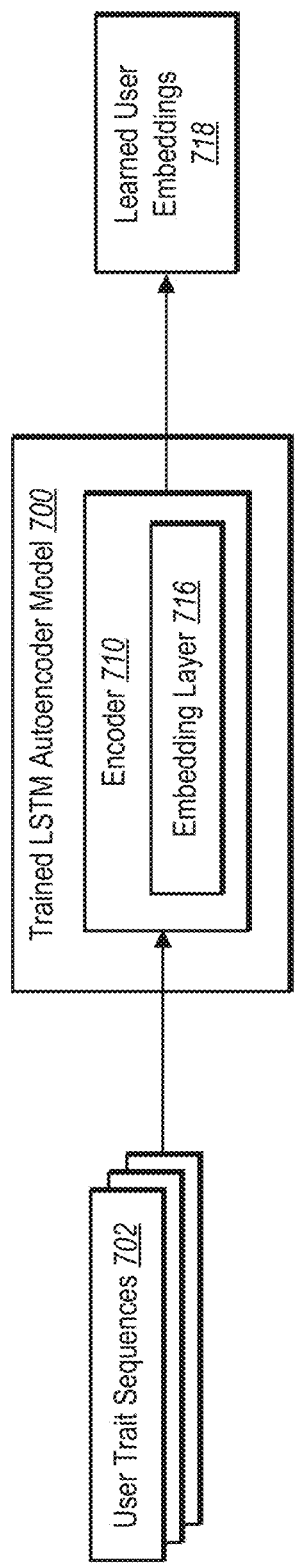

Regarding FIGS. 7A-7B, FIG. 7A illustrates example architecture of a long short-term memory (LSTM) autoencoder model 700 as well as a high-level overview of training the LSTM autoencoder model 700 to generate user embeddings (e.g., user trait embeddings). FIG. 7B illustrate utilizing the trained LSTM autoencoder model 700 to generate user embeddings. Creating, training, and utilizing the LSTM autoencoder model 700 is described in detail in U.S. patent application Ser. No. 16/149,357, titled "GENERATING USER EMBEDDING REPRESENTATIONS THAT CAPTURE A HISTORY OF CHANGES TO USER TRAIT DATA," and filed Oct. 2, 2018, the entire contents of which is hereby incorporated by reference.

As shown, the LSTM autoencoder model 700 includes an encoder 710 and a decoder 720. In one or more embodiments, the encoder 710 and the decoder 720 are LSTM networks. For example, the encoder 710 includes LSTM cells 712 (e.g., LSTM units) and the decoder 720 likewise includes LSTM cells 722.

As mentioned previously, the user embeddings system 104 utilizes the structured user data (e.g., user trait sequences) to train the LSTM autoencoder model 700. For instance, the user embeddings system 104 trains the encoder 710 to learn how to generate user embedding vectors from an input user trait sequence (i.e., the structured user data). The user embeddings system 104 simultaneously trains the decoder 720 to accurately reconstruct the input user trait sequence from the encoded user embeddings vector. Additional detail regarding training the LSTM autoencoder model 700 is provided below.

As shown, the encoder 710 includes LSTM cells 712, input vectors 714 and an embedding layer 716. As an overview, the embedding layer 716 receives user trait sequences and encodes the user trait sequences into input vectors 714. The LSTM cells 712 generate a user embeddings vector 718 based on the input vectors 714. More particularly, the embedding layer 716 can encode user trait changes in a user trait sequence (e.g., each entry in the user trait sequence) into the input vectors 714 that indicates to the encoder 710 which user trait is being added or removed for a user. The embedding layer 716 can utilize a variety of methods to encode the user trait sequences into the input vectors 714.

As shown in the encoder 710, the number of LSTM cells 712 can vary to match the number of input vectors 714. More particularly, the encoder 710 (and the decoder 720) can represent dynamic LSTM networks that adjust in size to equal the heterogeneously sized input vectors 714, while still producing homogeneous user embeddings of a uniform size. Indeed, the encoder 710 can receive an input user trait sequence of any length and generate a uniformed size user embeddings vector 718.

As FIG. 7A illustrates, the encoder 710 passes the user embeddings vectors to the decoder 720, which reconstructs the user embeddings vectors into target user trait sequences (i.e., predicted user trait sequence). In many respects, the decoder 720 is similar to the encoder 710. For example, the decoder 720 includes LSTM cells 722 that can correspond in type and number to the LSTM cells 712 in the encoder 710 (having different weights, biases, and parameters after training). Indeed, the architecture of the LSTM cells 722 in the decoder 720 align with the architecture of the LSTM cells 712 in the encoder 710. As mentioned previously, FIG. 7B provides example architecture of LSTM cells.

In addition, the decoder 720 includes a dense layer 724. The dense layer 724 learns to predict the target user trait sequence from the learned user embedding representation. For example, the dense layer 724 generates prediction vectors 726 that are utilized to reconstruct a user trait sequence. In particular, each of the prediction vectors 726 outputted from an LSTM cell is sized to include each potential user trait change (e.g., match the size of the user trait change dictionary). For each entry in a prediction vector, the dense layer 724 determines a probability that the next user trait change in the user embeddings vector 718 matches the corresponding user trait change. In many embodiments, the total probabilities in each prediction vector sum to one (i.e., 1). Then, using the highest probabilities from each of the prediction vectors 726, the user embeddings system 104 can generate a predicted user trait sequence (e.g., a target user trait sequence) that is intended to replicate the corresponding input user trait sequence.

In various embodiments, the dense layer 724 includes a classifier, such as a softmax regression classifier. The softmax regression classifier determines the probability, that the next user trait change from the user embeddings vector 718 is similar to a known user trait change, as described above. In many embodiments, the dense layer 724 includes weights, parameters, and algorithms that are tuned during training of the LSTM autoencoder model 700.

In one or more embodiment, the decoder 720 predicts a target user trait sequence that is designed to replicate an input user trait sequence. In other embodiments, the decoder 720 outputs the target user trait sequence in reverse order. Outputting the target user trait sequence in reverse order corresponds to decoding each entry of the sequence in reverse order.

Moreover, when decoding the user embeddings vector 718 in reverse order, the user embeddings system 104 can copy the last LSTM cell from the encoder 710 to the first LSTM cell of the decoder 720. For example, in various embodiments, the first LSTM cell of the decoder 720 includes the same weights, biases, and/or parameters of the last LSTM cell from the encoder 710. In this manner, the decoder 720 can more quickly learn to correctly decode the user embeddings vector 718. In alternative embodiments, each of the LSTM cells 722 in the decoder are randomly initialized or initialized to default weights and parameters.

To aid in the decoding process, in one or more embodiments, the LSTM autoencoder model 700 provides inputs (e.g., helper vectors) to the decoder 720 to help in decoding the user embeddings vector 718. For example, the LSTM autoencoder model 700 adds (e.g., sums) or includes embedding representations before the user embeddings vector 718 is provided to the decoder 720 that encode the decoder 720 with the ordinal user traits, thus improving and the decoding process and accelerating training.

To illustrate, as shown in FIG. 7A, the LSTM autoencoder model 700 provides an initial input vector 728 to the first of the LSTM cells 722 of the decoder 720. In one or more embodiments, the initial input vector 728 includes a vector generated by the encoder 710, such as a vector output from the last LSTM cell of the encoder 710. In some embodiments, the initial input vector 728 includes a current hidden state vector, a previous hidden state vector, a history vector, a clock vector, a current state vector, and/or a previous state vector. In some embodiments, the initial input vector 728 includes a tag, such as a start tag that indicates to the first LSTM cell to start decoding the user embeddings vector 718. In a few embodiments, the initial input vector 728 includes random data. Additionally, in one or more embodiments, the LSTM autoencoder model 700 does not include the initial input vector 728 to the first of the LSTM cells 722 of the decoder 720.

Similarly, the LSTM autoencoder model 700 and/or decoder 720 can provide helper input vectors to other of the LSTM cells 722. For example, as shown in FIG. 7A, the decoder 720 provides the subsequent LSTM cells with the input vectors 714 (in reverse order) that convey an indication of the previous user trait change in the user trait sequence. In this manner, the decoder 720 can more quickly train and learn to predict accurate target user trait sequences. Indeed, the decoder 720 can employ enforced teaching during training.

As mentioned above, FIG. 7A also illustrates training the LSTM autoencoder model 700 to generate user embeddings based on user trait sequences. In various embodiments, to train the LSTM autoencoder model 700, the user embeddings system 104 provides the user trait sequences 704 (i.e., structured user data in the form of a user traits sequence) to the encoder 710. More particularly, as described above, the encoder 710 utilizes the embedding layer to generate input vectors, which are provided to the LSTM cells. Further, for each of the input user trait sequences, the encoder 710 generates a user embeddings vector 718.

In addition, the LSTM autoencoder model 700 provides the user embeddings vector 718 to the decoder 720, which is trained to reconstruct the input user trait sequence. As described previously, the LSTM autoencoder model 700 can copy the last LSTM cell of the encoder 710 to the first LSTM cell of the decoder 720. Moreover, in some embodiments, the LSTM autoencoder model 700 can provide additional input to the first LSTM cell of the decoder 720.

As explained previously, the decoder 720 includes LSTM cells and a dense layer that the decoder 720 utilizes to predict the next user trait change in a sequence based on the user embeddings vector 718. In various embodiments, the decoder 720 utilizes a softmax regression classifier to determine the probability that the next user trait change from the user embeddings vector 718 is similar to a known user trait change, as further described below.

Further, as shown in FIG. 7A, the LSTM autoencoder model 700 also includes a loss layer 730. In one or more embodiments, the loss layer 730 is included in the decoder 720. In general, the LSTM autoencoder model 700 utilizes the loss layer 730 to train the encoder 710 and the decoder 720 using prediction error 732 via back propagation. For example, the LSTM autoencoder model 700 employs the error loss feedback vector (i.e., the prediction error 732) to tune the weighted matrices, biases, and parameters of the LSTM cells in the encoder 710 and the decoder 720. Further, the LSTM autoencoder model 700 employs the prediction error 732 to tune the embedded layer in the encoder 710 and the dense layer in the decoder 720.

More particularly, the loss layer 730 receives the predicted user trait sequence reconstructed from the dense layer of the decoder 720 and compares the predicted user trait sequence to a ground truth sequence. The ground truth sequence copies the input user trait sequence from the user trait sequences 704 provided to the encoder 710. For each user trait change in a user trait sequence, the loss layer 730 determines an amount of error loss due to an inaccurate prediction. Further, the loss layer 730 can sum the error loss into a combined error loss feedback vector (i.e., the prediction error 732) for each training iteration.

Moreover, using the prediction error 732, the user embeddings system 104 can train the LSTM autoencoder model 700 via back propagation until the overall loss is minimized (e.g., the encoder 710 provides a user embeddings vector 718 that the decoder 720 successfully decodes). Indeed, the user embeddings system 104 can conclude training when the LSTM autoencoder model 700 converges, total training loss amount is minimized, and/or the decoder 720 successfully decodes user embedding vectors encoded by the encoder 710.

Turning now to FIG. 7B, additional detail is provided with respect to generating user embeddings from a trained LSTM autoencoder model 700. To illustrate, FIG. 7B shows utilizing the trained LSTM autoencoder model 700 to generate learned user embeddings. More particularly, FIG. 7B illustrates an example embodiment of the user embeddings system 104 generating learned user embeddings 718 from user trait sequences 702 (i.e., structured user data) by utilizing a trained encoder 710 within a trained LSTM autoencoder model 700.

In one or more embodiments, the user embeddings system 104 receives user trait sequences 702. For example, as explained above and described in detail in U.S. patent application Ser. No. 16/149,357 (referenced above), the user embeddings system 104 generates the user trait sequences 702 (i.e., structured user data) from user trait data (i.e., user profile data). For instance, the user trait sequences 702 include a user trait sequence for each user that indicates the order of the user trait changes for the user.

As illustrated, the user embeddings system 104 provides user trait sequences 702 to the trained LSTM autoencoder model 700. In response, the trained LSTM autoencoder model 700 feeds the user trait sequences 702 to the encoder 710, which includes a trained embedding layer 716. As mentioned above, the embedding layer 716 is trained to learn encoded numerical values that indicate the relationship of each user trait change within a user trait sequence to the LSTM cells of the encoder 710.

More particularly, upon receiving the user trait sequences 702, the embedding layer 716 indexes each user trait change (e.g., user trait delta) in a user trait sequence into an input vector. The input vectors are then fed to the LSTM cells having trained weights, biases, and parameters. The LSTM cells of the encoder 710 generate learned user embeddings 718 for each of the user trait sequences 702. As described above, the learned user embeddings 718 for each user provide a uniform and homogeneous representation of a user's trait interactions over time, which conventional systems previously struggled to achieve.

In addition, upon obtaining the learned user embeddings 718 for each user, the user embeddings system 104 can perform additional actions to identify users that share similar contexts with each other with respect to user traits and/or user interactions. In particular, the user embeddings system 104 can utilize the user embeddings to generate expanded user segment, as described herein.

FIGS. 7A-7B described various embodiments of training an LSTM autoencoder model 700 and generating user embeddings (e.g., user traits embeddings) for users. Accordingly, the actions and algorithms described in connection with FIGS. 7A-7B provide example structure for generating a plurality of user embeddings for a plurality of users based on structured user data that transforms user profile data into uniform user embedding vectors. More particularly, the actions and algorithms described in training the LSTM autoencoder model 700 with respect to FIG. 7A as well as using the LSTM autoencoder model 700 to obtain user embeddings with respect to FIG. 7B can provide structure for performing a step for generating the user embeddings for the plurality of users that encode how traits change over time utilizing the user trait sequences.

Similarly, FIGS. 7A-7B, the above description, and U.S. patent application Ser. No. 16/149,357 (referenced above), provide example structure for converting user profile data for the plurality of users into structured user data that encodes user attributes into the structured user data. Indeed, FIGS. 7A-7B, corresponding description, and the subject matter incorporated above provide actions and algorithms to performing a step for converting the user profile data into user trait sequences for the plurality of users based on user trait data and associated timestamps from the user profile data.

Figure 8:
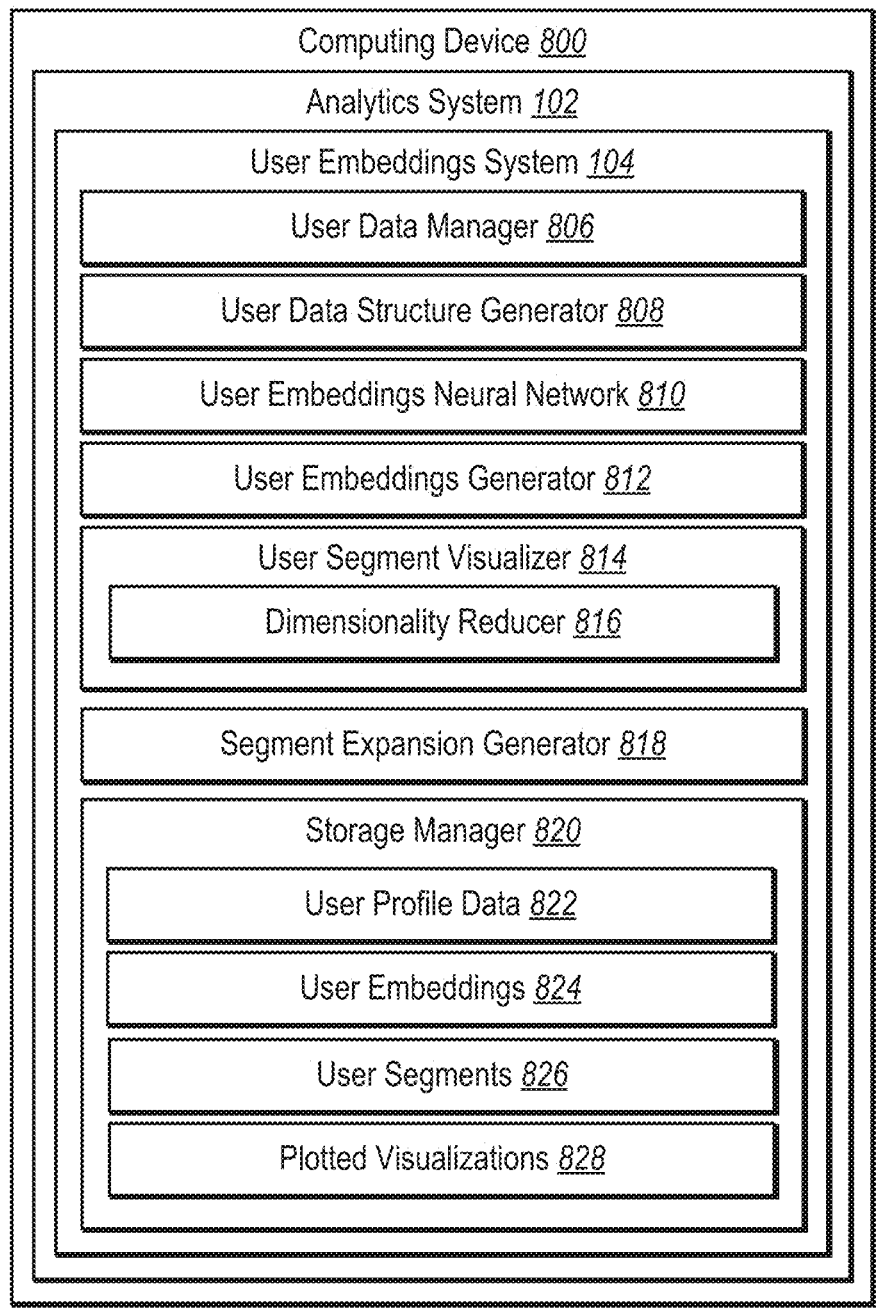
FIG. 8 illustrates a schematic diagram of a user embeddings system in accordance with one or more embodiments.

Referring now to FIG. 8, additional detail will be provided regarding capabilities and components of the user embeddings system 104 in accordance with one or more embodiments. In particular, FIG. 8 shows a schematic diagram of an example architecture of the user embeddings system 104 located within an analytics system 102 (described previously) and hosted on a computing device 800. The user embeddings system 104 can represent one or more embodiments of the user embeddings system 104 described previously.

As shown, the user embeddings system 104 is located on a computing device 800 within an analytics system 102, as described above. In general, the computing device 800 may represent various types of computing devices (e.g., the server device 101, the third-party server device 108, or an administrator client device). In some embodiments, the computing device 800 represents the user client devices 110a-110n. To demonstrate, in various embodiments, the computing device 800 is a non-mobile device, such as a desktop or server, or a client device. In other embodiments, the computing device 800 is a mobile device, such as a mobile telephone, a smartphone, a PDA, a tablet, a laptop, etc. Additional details with regard to the computing device 800 are discussed below as well as with respect to FIG. 10.

As illustrated in FIG. 8, the user embeddings system 104 includes various components for performing the processes and features described herein. For example, the user embeddings system 104 includes a user data manager 806, a user data structure generator 808, a user embeddings neural network 810, a user embeddings generator 812, a user segment visualizer 814, a segment expansion generator 818 and a storage manager 820. Each of these components is described below in turn.

As shown, the user embeddings system 104 includes the user data manager 806. In general, the user data manager 806 can receive, access, detect, store, copy, identify, determine, filter, remove, and/or organize user profile data 822 (e.g., user interaction data and/or user traits data). In one or more embodiments, user profile data includes interactions between a user and content items as well as metadata associated with the user (e.g., user identifier), the content items (e.g., content item identifier), and the interaction (e.g., time, type, number, frequency). In some embodiments, the user data manager 806 can store and access the user profile data 822 from the storage manager 820 on the computing device 800.

As shown, the user embeddings system 104 includes a user data structure generator 808. The user data structure generator 808 can determine, identify, analyze, structure, organize, arrange, prioritize, rank, edit, modify, copy, remove, extract, parse, filter, and/or integrate the user profile data 822 to prepare the user profile data for training a user embeddings neural network 810. For example, as described above in detail, the user data structure generator 808 can organize the user profile data 822 in a one or more data structures. For example, the user data structure generator 808 organizes the user profile data 822 into a hierarchy that encodes contextual relationships between user interactions within the user profile data. In another example, the user data structure generator 808 generates user trait sequences from the user profile data 822 by indicating user trait changes for a user as the user reveals or hides user traits over time as well as encode sequential information of user traits and time into the user trait sequences.

As shown, the user embeddings system 104 includes the user embeddings neural network 810. The user embeddings neural network 810 can represent one or more neural networks or machine-learning models. For example, the user embeddings neural network 810 is an interaction-to-vector neural network and/or an LSTM autoencoder model. In any case, the user embeddings neural network 810 commonly includes a number of neural network layers. In some embodiments, the neural network layers include input layers, hidden layers, output layers, a classification layer, and/or a loss layer. In some embodiments, the user embeddings neural network 810 includes multiple neural networks and layers, such as an LSTM encoder neural network and an LSTM decoder neural network, an embedding neural network layer, a dense (classification) layer, and/or an error prediction loss layer. In various embodiments, the user embeddings system 104 trains one or more of these neural networks and/or layers through via back propagation, as described above in connection with FIG. 6A and FIG. 7A.

In one or more embodiments, the user embeddings system 104 trains the user embeddings neural network 810 with the structured user data. For example, as described above, the user embeddings system 104 feeds the structured user data into the user embeddings neural network 810 to generate user embeddings 824. The user embeddings system 104 utilizes cross-entropy prediction error loss and back propagation to tune the weights, biases, and parameters of the user embeddings neural network 810, as previously described in connection with FIG. 6A and FIG. 7A.

As shown, the user embeddings system 104 includes the user embeddings generator 812. In general, the user embeddings generator 812 utilizes the trained user embeddings neural network 810 to generate learned user embeddings 824 from the structured user data. Additional detail regarding generating user embeddings 824 is provided above with respect to FIG. 6B and FIG. 7B.

In addition, as shown, the user embeddings system 104 includes a user segment visualizer 814. In general, the user segment visualizer 814 identifies and plots base user segments, as described above. For example, the user segment visualizer 814 displays one or more generated user embeddings within a graphical user interface of a client device (e.g., an administrator client device). Further, the user segment visualizer 814 can provide options for a user to modify expansion parameters in connection with a user requesting to expand a base user segment as well as update a plotted visualization when a user segment is expanded, pruned, or otherwise modified. In some embodiments, the user segment visualizer 814 can store and access plotted visualizations 828 from the storage manager 820 on the computing device 800.

The user segment visualizer 814 includes a dimensionality reducer 816. In one or more embodiments, the dimensionality reducer 816 employs machine-learning to reduce the dimensionality of high-dimensional user embeddings to two- or three-dimensional user embeddings to enable the user embeddings to be displayed on a client device. Additional detail regarding reducing the dimensionality of user embeddings is provided above.

Moreover, the user embeddings system 104 includes a segment expansion generator 818. In general, the segment expansion generator 818 identifies additional users from a group of users to include in a user segment. For example, as described above, the segment expansion generator 818 utilizes the user embeddings of users in a base user segment to determine holistically similar or look-alike users to include in an expanded user segment. Additional detail regarding expanding a user segment is provided above with respect to FIGS. 3A-3F.

In some embodiments, the segment expansion generator 818 saves the user segments 826 within the storage manager 820, as shown in FIG. 8. In particular, the segment expansion generator 818 stores and updates base user segments and expanded user segments. In this manner, the user embeddings system 104 can retrieve and utilize the user segments 826 at a future time for various applications, as described above. For example, the user embeddings system 104 can utilize the user segments 826 to perform various prediction use cases like clustering segmentation, segment expansion, and as input to other deep learning/traditional predictive models.

Each of the components 806-828 of the user embeddings system 104 can include software, hardware, or both. For example, the components 806-828 can include one or more instructions stored on a computer-readable storage medium and executable by processors of one or more computing devices, such as a client device or server device. When executed by the one or more processors, the computer-executable instructions of the user embeddings system 104 can cause the computing device(s) to perform the feature learning methods described herein. Alternatively, the components 806-828 can include hardware, such as a special-purpose processing device to perform a certain function or group of functions. Alternatively, the components 806-828 of the user embeddings system 104 can include a combination of computer-executable instructions and hardware.

Furthermore, the components 806-828 of the user embeddings system 104 may, for example, be implemented as one or more operating systems, as one or more stand-alone applications, as one or more modules of an application, as one or more plug-ins, as one or more library functions or functions that may be called by other applications, and/or as a cloud computing model. Thus, the components 806-828 may be implemented as a stand-alone application, such as a desktop or mobile application. Furthermore, the components 806-828 may be implemented as one or more web-based applications hosted on a remote server. The components 806-828 may also be implemented in a suite of mobile device applications or "apps." To illustrate, the components 806-828 may be implemented in an application, including but not limited to ADOBE® CLOUD PLATFORM or ADOBE® ANALYTICS CLOUD, such as ADOBE® ANALYTICS, ADOBE® AUDIENCE MANAGER, ADOBE® CAMPAIGN, ADOBE® EXPERIENCE MANAGER, and ADOBE® TARGET. "ADOBE," "ADOBE ANALYTICS CLOUD," "ADOBE ANALYTICS," "ADOBE AUDIENCE MANAGER," "ADOBE CAMPAIGN," "ADOBE EXPERIENCE MANAGER," and "ADOBE TARGET" are either registered trademarks or trademarks of Adobe Systems Incorporated in the United States and/or other countries.

Figure 9:
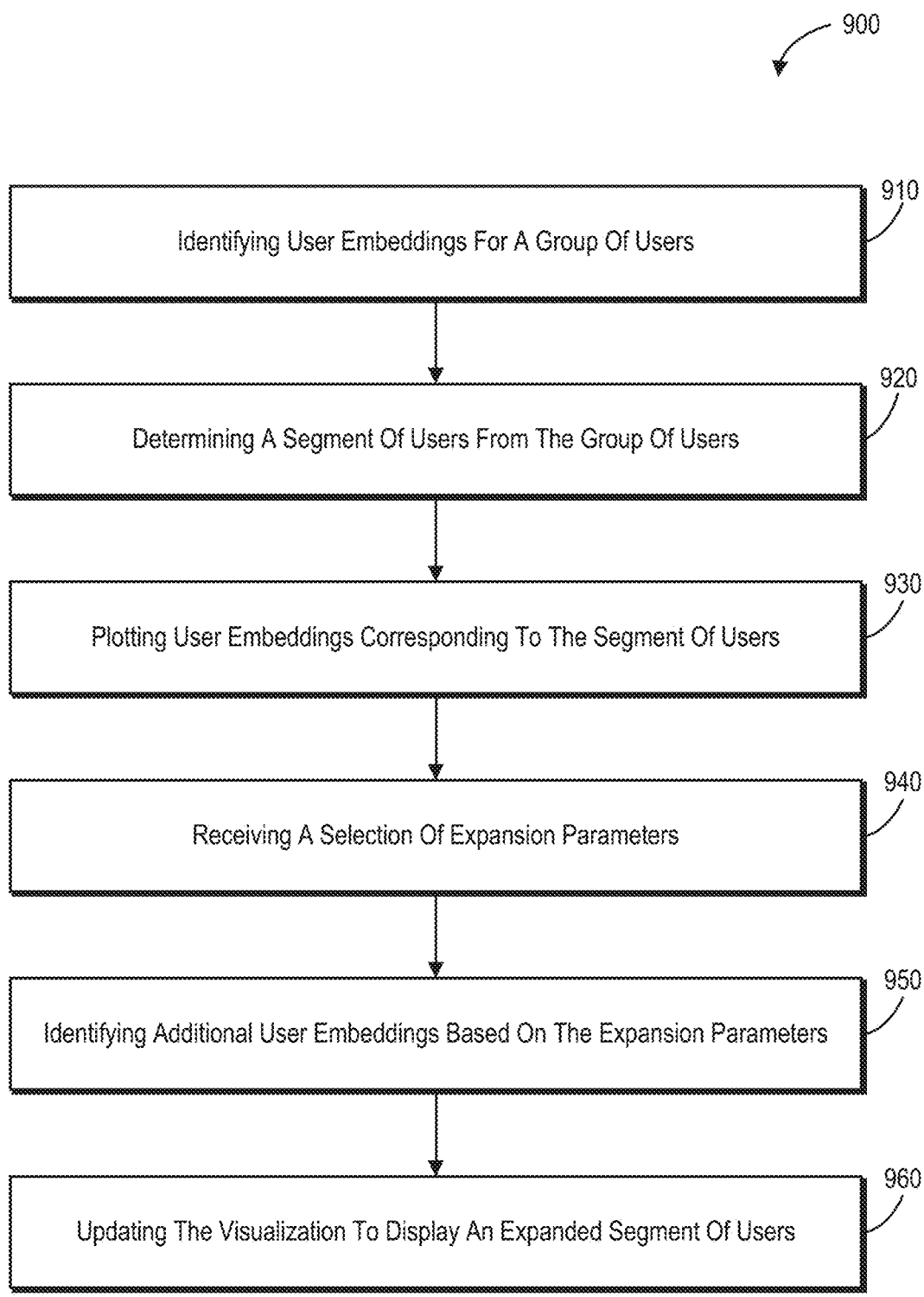
FIG. 9 illustrates a flowchart of a series of acts for automatically expanding a user segment in accordance with one or more embodiments.

FIGS. 1-8, the corresponding text, and the examples provide a number of different methods, systems, devices, and non-transitory computer-readable media of the user embeddings system 104. In addition to the foregoing, one or more embodiments can also be described in terms of flowcharts comprising acts for accomplishing a particular result, as shown in FIG. 9. FIG. 9 may be performed with more or fewer acts. Further, the acts may be performed in differing orders. Additionally, the acts described herein may be repeated or performed in parallel with one another or parallel with different instances of the same or similar acts.

As mentioned, FIG. 9 illustrates a flowchart of a series of acts 900 for automatically expanding a user segment in accordance with one or more embodiments. While FIG. 9 illustrates acts according to one embodiment, alternative embodiments may omit, add to, reorder, and/or modify any of the acts shown in FIG. 9. The series of acts 900 can be performed as part of a method. Alternatively, a non-transitory computer-readable medium can comprise instructions that, when executed by one or more processors, cause a computing device to perform the series of acts 900 of FIG. 9. In some embodiments, a system can perform the series of acts 900.

In one or more embodiments, the series of acts 900 is implemented on one or more computing devices, such as the computing device 800 or the server device 101. In addition, in some embodiments, the series of acts 900 is implemented in a digital environment, such as a digital medium environment for tracking user interactions with content items and/or generating user embedding types. For example, the series of acts 900 is implemented on a computing device having memory that stores user profile data for a plurality of users, user interaction data for the plurality of users corresponding to interactions with a first digital campaign, and/or user embeddings for the plurality of users from a neural network trained to generate the user embeddings from the user profile data.

The series of acts 900 includes an act 910 of identifying user embeddings for a group of users. In particular, the act 910 can involve identifying user embeddings for a plurality of users generated from structured user data utilizing a neural network trained to create user embeddings that encode user profile data into uniform user embeddings. In various embodiments, the act 910 includes identifying the user profile data indicating user attributes for the plurality of users.

In one or more embodiments, the act 910 includes identifying user profile data made up of user interaction data that indicates the plurality of users performing a plurality of interactions with a plurality of content items. In addition, the act 910 includes generating the structured user data as user interaction data organized into a hierarchy structure based on the plurality of content items, then the plurality of interactions, then interaction timestamps. Further, the act 910 includes generating the user interaction embeddings for the plurality of users from the organized user interaction data utilizing an interaction-to-vector neural network.

In additional or alternative embodiments, the act 910 includes identifying user profile data made up of user traits corresponding to a plurality of timestamps for the plurality of users. In addition, the act 910 includes generating the structured user data as user trait sequences for the plurality of users that encodes user trait changes associated with the plurality of users with respect to the plurality of timestamps. Further, the act 910 includes generating user trait embeddings for the plurality of users from the user trait sequences utilizing an LSTM autoencoder neural network trained to generate user trait embeddings that encode how traits change over time.

The series of acts 900 includes an act 920 of determining a segment of users from the group of users. In particular, the act 920 can involve determining a segment of users from the plurality of users based on user-provided parameters. In some embodiments, the act 920 includes receiving a one or more rules, condition, or requirements that define which users to include in a user segment (e.g., how to identify base users to include in a base user segment).

As shown, the series of acts also includes an act 930 of plotting user embeddings corresponding to the segment of users. In particular, the act 930 can involve plotting, within a graphical user interface having a user-manipulatable visualization, user embeddings corresponding to the segment of users. In various embodiments, the act 930 includes providing, within a graphical user interface provided to a client device, a visualization that displays a segment of user embeddings from the user embeddings generated for the plurality of users. In some embodiments, the act 930 includes reducing dimensionality of the segment of user embeddings from high-dimensional space to three-dimensional space, where the visualization displays the segment of user embeddings in three-dimensional space.

As shown, the series of acts 900 additionally includes an act 940 of receiving a selection of expansion parameters. In particular, the act 940 can involve receiving a selection of a user embeddings type and a corresponding user similarity metric. In some embodiments, the act 940 includes receiving, from the client device, user input to expand the displayed segment of user embeddings.

In additional embodiments, regarding the act 940, the user embedding types include a first user embeddings type that includes a user interaction embeddings and a second user embeddings type that includes a user traits embeddings. In some embodiments, regarding the act 940, the user similarity metric corresponds to a similarity range of similar users and the metric amount includes a distance of similar users where the distance is a radial distance in high-dimensional vector space based on cosine similarity.

As shown, the series of acts 900 also includes an act 950 of identifying additional user embeddings based on the expansion parameters. In particular, the act 950 can involve identifying additional user embeddings having the selected user embedding type that satisfy the user similarity metric. In some embodiments, the act 950 includes determining additional user embeddings that are similar to the segment of user embeddings based on user input from the client device to expand the displayed segment of user embeddings.

In some embodiments, the act 950 includes determining users from the plurality of users that have the smallest user embeddings cosine distances to the segment of users in the base user segment until the number of similar users is satisfied. In various embodiments, the act 950 includes identifying the additional user embeddings based on determining a cosine similarity in high-dimensional space of the generated user embeddings with respect to the user embeddings corresponding to the segment of users (e.g., the base users in the base user segment).

In one or more embodiments, the act 950 includes detecting a selection of a user similarity metric corresponding to a number of similar users and determining, based on the selected user similarity metric, the number of similar users to be identified. In additional embodiments, the act 950 includes identifying the additional user embeddings until the number additional user embeddings match the number of similar users to be identified.

In some embodiments, the act 950 includes detecting a selection of a user similarity metric corresponding to a similarity range of similar users and determining the similarity range of similar users to be identified based on the selected user similarity metric. Further, in additional embodiments, the act 950 includes identifying the additional user embeddings to include generated user embeddings of the plurality of users that are within the similarity range of the selected user similarity metric.

As shown, the series of acts additionally includes an act 960 of updating the visualization to display an expanded segment of users. In particular, the act 960 includes updating the visualization to display an expanded segment of users including the user embeddings corresponding to the segment of users and the additional user embeddings. In one or more embodiments, the act 960 includes providing, within the graphical user interface provided to the client device, an updated visualization that displays the segment of user embeddings and an expanded segment of user embeddings.

The series of acts can, in some embodiments, include additional actions. For example, in one or more embodiments, the series of acts 900 include the acts of displaying an additional visualization that displays a distribution of user characteristics for the segment of user embeddings plotted in the visualization within the graphical user interface, receiving a selection of a user characteristic displayed in the additional visualization, and identifying user embeddings from the segment of user embeddings displayed in the visualization that have the selected user characteristic. In additional embodiments, the series of acts 900 also include the acts of removing the identified user embeddings having the selected user characteristic from the segment of user embeddings, and updating the visualization to exclude display of the identified user embeddings in three-dimensional space.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In addition, as used herein, the term "cloud computing environment" refers to an environment in which cloud computing is employed.

Figure 10:
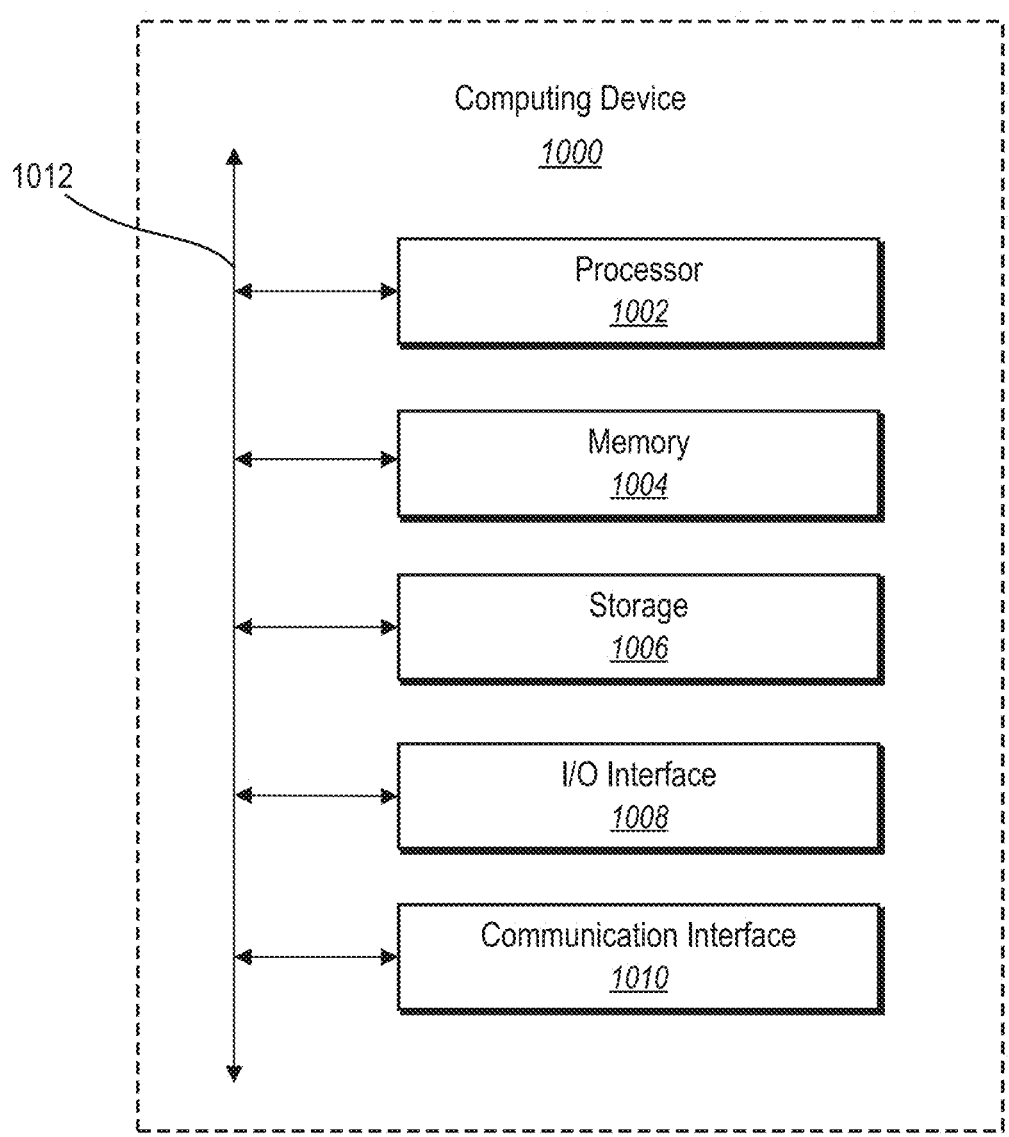
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., computing device 800, server device 101, 108, administrator client device 114, and user client devices 110a-110n, 300). In one or more embodiments, the computing device 1000 may be a non-mobile device (e.g., a desktop computer or another type of client device). Further, the computing device 1000 may be a server device that includes cloud-based processing and storage capabilities. In some embodiments, the computing device 1000 may be a mobile device (e.g., a mobile telephone, a smartphone, a PDA, a tablet, a laptop, a camera, a tracker, a watch, a wearable device, etc.).

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for generating user embedding types, a computer-implemented method for visualizing user representations, comprising:
   generating a plurality of user embedding vectors for a plurality of users generated from structured user data utilizing a long short-term memory (LSTM) autoencoder neural network that creates user embedding vectors that encode user profile data of unequal sizes into uniform user embedding vectors of an equal size within a high-dimensional vector space;
   providing, within a graphical user interface provided to a client device and based on the user embedding vectors being equal in size, a visualization that displays a segment of user visual representations from the user embedding vectors generated for the plurality of users;
   based on user input from the client device to expand the displayed segment of user visual representations in accordance with a target user embedding type, comparing the plurality of user embedding vectors to determine additional user embedding vectors that have uniform user embedding vectors that are similar in the high-dimensional vector space to the segment of user embedding vectors having the target user embedding type; and
   providing, within the graphical user interface provided to the client device, an updated visualization that displays the segment of user visual representations and an expanded segment of user visual representations.

2. The computer-implemented method of claim 1, further comprising:
   displaying, within the graphical user interface, an additional visualization that displays a distribution of user characteristics for the segment of user visual representations plotted in the visualization;
   receiving a selection of a user characteristic displayed in the additional visualization;
   identifying user visual representations from the segment of user visual representations displayed in the visualization that have the selected user characteristic;
   removing the identified user visual representations having the selected user characteristic from the segment of user visual representations; and
   updating the visualization to exclude display of the identified user visual representations in three-dimensional space.

3. The computer-implemented method of claim 1, further comprising:
   identifying the user profile data indicating user attributes for the plurality of users;
   identifying the segment of user visual representations from the generated plurality of user embedding vectors;
   reducing dimensionality of the plurality of user embedding vectors from high-dimensional space to three-dimensional space to generate the segment of user visual representations, wherein the visualization displays the segment of user visual representations in three-dimensional space; and
   receiving, from the client device, user input to expand the displayed segment of user visual representations.

4. The computer-implemented method of claim 3, further comprising receiving a selection of a similarity expansion mode in connection with the target user embedding type, the similarity expansion mode comprises a number of similar users or a similarity range of similar users.

5. The computer-implemented method of claim 4, further comprising converting the user profile data of unequal sizes for the plurality of users into the structured user data that comprises content items, interaction types, and interaction timestamps.

6. The computer-implemented method of claim 5, wherein the structured user data of unequal sizes comprises heterogeneous user interaction data of unequal sizes.

7. The computer-implemented method of claim 1, further comprising converting the user profile data into user trait sequences for the plurality of users based on user trait data and associated timestamps from the user profile data.

8. The computer-implemented method of claim 7, wherein the user embedding vectors for the plurality of users encode how traits change over time utilizing the user trait sequences.

9. A non-transitory computer-readable medium storing instructions that, when executed by at least one processor, cause a computer system to:
  generate user embedding vectors for a plurality of users generated from structured user data utilizing an autoencoder neural network that creates user embedding vectors that encode user profile data of unequal sizes into uniform user embedding vectors of an equal size within high-dimensional vector space;
  determine a segment of users from the plurality of users based on user-provided parameters;
  plot, within a graphical user interface having a user-manipulatable visualization, user visual representations corresponding to user embedding vectors of the segment of users;
  receive a selection of a target user embedding type of a plurality of user embedding types and a similarity expansion mode;
  based on identifying the target user embedding type from the selection, compare the target user embedding type to the user embedding vectors for the plurality of users in the high-dimensional vector space to identify additional user embedding vectors having the target user embedding type that satisfies the similarity expansion mode; and
  update the user-manipulatable visualization to display an expanded segment of users comprising user visual representations corresponding to user embedding vectors of the segment of users and the additional user embedding vectors.

10. The non-transitory computer-readable medium of claim 9, wherein the plurality of user embedding types comprise:
  a first user embedding type comprising a user interaction embeddings; and
  a second user embedding type comprising a user traits embeddings.

11. The non-transitory computer-readable medium of claim 10, further comprising instructions that, when executed by at least one processor, cause the computer system to identify the additional user embedding vectors based on determining a total combined distance between all features of the generated user embedding vectors in the high-dimensional vector space and the target user embedding vectors.

12. The non-transitory computer-readable medium of claim 9, wherein the instructions that cause the computer system to identify the additional user embedding vectors comprises:
  detect a selection of a similarity expansion mode corresponding to a number of similar users;
  determine, based on the selected similarity expansion mode, the number of similar users to be identified; and
  identify the additional user embedding vectors until the additional user embedding vectors match the number of similar users to be identified.

13. The non-transitory computer-readable medium of claim 9, wherein the instructions that cause the computer system to identify the additional user embedding vectors comprises:
  detect a selection of a similarity expansion mode corresponding to a similarity range of similar users;
  determine, based on the selected similarity expansion mode, the similarity range of similar users to be identified; and
  identify the additional user embedding vectors to include generated user embedding vectors of the plurality of users that are within the similarity range of the selected similarity expansion mode.

14. The non-transitory computer-readable medium of claim 9, further comprising instructions that, when executed by at least one processor, cause the computer system to:
  identify the user profile data that comprises user interaction data indicating the plurality of users performing a plurality of interactions with a plurality of content items;
  generate the structured user data as user interaction data organized into a hierarchy structure based on the plurality of content items, then the plurality of interactions, then interaction timestamps; and
  wherein creating the generated user embedding vectors that encode the user profile data of unequal sizes into uniform user embedding vectors of the equal size within the high-dimensional vector space comprises generating the user embeddings for the plurality of users from the organized user interaction data utilizing an interaction-to-vector neural network.

15. The non-transitory computer-readable medium of claim 9, further comprising instructions that, when executed by at least one processor, cause the computer system to:
  identify the user profile data that comprises user traits that correspond to a plurality of timestamps for the plurality of users;
  generate the structured user data as user trait sequences for the plurality of users that encodes user trait changes with respect to the plurality of timestamps based on the user traits; and
  wherein creating the generated user embedding vectors that encode the user profile data of unequal sizes into uniform user embedding vectors of the equal size within the high-dimensional vector space comprises generating user trait embeddings for the plurality of users from the user trait sequences utilizing an long short-term memory (LSTM) autoencoder neural network that generates the user trait embeddings that encode how traits change over time.

16. A system for visualizing high-dimensional user embedding vectors as user visual representations in low-dimensional space comprising:
  at least one processor;
  a memory that comprises:
    user trait sequences converted from user profile data for a plurality of users based on user trait data and associated timestamps from the user profile data;
    user interaction data for the plurality of users corresponding to interactions with a first digital campaign; and
    user embedding vectors for the plurality of users generated from an long-short-term memory (LSTM)

neural network that generates uniform user embedding vectors of an equal size from the user trait data of unequal sizes;

at least one non-transitory computer-readable storage medium storing instructions that, when executed by the at least one processor, cause the system to:

identify a segment of users from the plurality of users;

determine additional users that have user embedding vectors of a target user embedding type and within a similarity threshold of the segment of users by utilizing user embedding distance comparisons that compare each feature of the user embedding vectors;

expand the segment of users to comprise the additional users by including users having user embedding vectors within a user embedding threshold distance to the segment of users having the target user embedding type; and facilitate a second promotional campaign to provide content to the expanded segment of users.

17. The system of claim 16, further comprising instructions that, when executed by at least one processor, cause the system to plot, within a graphical user interface, the expanded segment of users as user visual representations within a three-dimensional visualization.

18. The system of claim 16, wherein the instructions that cause the system to determine the additional users that have user embedding vectors within the similarity threshold of the segment of users comprises:

receiving a selection of a similarity expansion mode and a metric amount corresponding to the similarity expansion mode, wherein the similarity expansion mode comprises a number of similar users or a similarity range of similar users; and identifying the additional users based on determining user embedding vectors from the plurality of users that have a cosine distance to the segment of users satisfying the metric amount.

19. The system of claim 18, wherein:

the similarity expansion mode corresponds to a number of similar users;

the metric amount comprises a number of users; and identifying the additional users comprises determining, until the number of similar users is satisfied, users from the plurality of users that have smallest user embedding vectors cosine distances to the segment of users who interacted with a content item of the first digital campaign.

20. The system of claim 18, wherein:

the similarity expansion mode corresponds to a similarity range of similar users;

the metric amount comprises a distance of similar users, the distance being a radial distance in high-dimensional vector space based on cosine similarity; and identifying the additional users further comprises determining generated user embedding vectors from the plurality of users that are within the threshold distance of user embedding vectors to the segment of users who interacted with a content item of the first digital campaign.

* * * * *